United States Patent
Itoh et al.

(10) Patent No.: US 7,740,392 B2
(45) Date of Patent: Jun. 22, 2010

(54) SURFACE ILLUMINATION APPARATUS AND LIQUID CRYSTAL DISPLAY

(75) Inventors: Tatsuo Itoh, Osaka (JP); Takayuki Nagata, Osaka (JP); Shinichi Shikii, Nara (JP); Tetsuro Mizushima, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 12/031,329

(22) Filed: Feb. 14, 2008

(65) Prior Publication Data

US 2008/0192173 A1  Aug. 14, 2008

(30) Foreign Application Priority Data

Feb. 14, 2007  (JP) ............................. 2007-033172

(51) Int. Cl.
    *F21V 7/04*  (2006.01)
(52) U.S. Cl. .................... 362/625; 362/619; 362/553
(58) Field of Classification Search ......... 362/608–610, 362/612, 293, 625, 619, 553
    See application file for complete search history.

(56) References Cited

U.S. PATENT DOCUMENTS

| 5,700,078 | A  | * | 12/1997 | Fohl et al. ................. 362/553 |
| 6,425,673 | B1 | * | 7/2002  | Suga et al. ................. 362/613 |
| 6,429,429 | B1 | * | 8/2002  | Fohl et al. ................. 250/353 |
| 6,869,185 | B2 | * | 3/2005  | Kaminsky et al. ............ 353/31 |
| 7,085,060 | B2 | * | 8/2006  | Matsushita et al. .......... 359/599 |
| 2003/0117792 | A1 | * | 6/2003 | Kunimochi et al. ........... 362/31 |
| 2006/0092618 | A1 |   | 5/2006 | Tanaka et al. |
| 2007/0273810 | A1 | * | 11/2007 | Lee et al. ................... 349/65 |
| 2008/0025043 | A1 | * | 1/2008 | Lee ........................... 362/608 |
| 2008/0232133 | A1 | * | 9/2008 | Segawa ....................... 362/610 |
| 2008/0247150 | A1 | * | 10/2008 | Itoh et al. ................... 362/19 |

FOREIGN PATENT DOCUMENTS

| JP | 10-104617    | 4/1998 |
| JP | 2002-169480  | 6/2002 |
| JP | 2005-242177  | 9/2005 |
| JP | 2006-134975  | 5/2006 |
| JP | 2006-202703  | 8/2006 |

\* cited by examiner

*Primary Examiner*—Jong-Suk (James) Lee
*Assistant Examiner*—Julie A Shallenberger
(74) *Attorney, Agent, or Firm*—Wenderoth, Lind & Ponack, L.L.P.

(57) ABSTRACT

A surface illumination apparatus is provided which includes a laser light source and a light guide plate upon which a laser beam emitted from the laser light source is incident through an end-surface portion and from which the laser beam is emitted through a main-surface portion on one side thereof. The laser beam is incident through an end-surface portion at an inclination angle to a main-surface portion on the other side which faces the one main-surface portion of the light guide plate, undergoes a change in the optical-path direction thereof by the other main-surface portion, is incident on the one main-surface portion and is emitted as a substantially parallel beam from the one main-surface portion.

13 Claims, 12 Drawing Sheets

SURFACE ILLUMINATION APPARATUS AND LIQUID CRYSTAL DISPLAY

BACKGROUND OF THE INVENTION

1. Field of the Invention

The present invention relates to a surface illumination apparatus in which a laser light source is used as a source for light emission, and a liquid crystal display provided with this surface illumination apparatus.

2. Description of the Background Art

A liquid crystal display displays an image by controlling the transmission quantity of a beam of light projected from its rear surface, using an electro-optical effect by the orientation of liquid-crystal molecules. This method is employed, and thus in general, a backlight unit is needed which is formed by a cold-cathode fluorescent tube and the like. In such a liquid crystal display, in recent years, its screen size has become increasingly large, and even a 50-inch size display for television has been put to practical use. At the same time, however, its power consumption increases as its size is larger, and thus, the necessity arises for the development of an art of lessening the power consumption. As described above, a liquid crystal display is not a self-light-emission display, and thus, the power consumed in the light source of a backlight unit is greater than the power consumed in a liquid-crystal display panel.

In order to reduce the power consumption of the backlight-unit light source to a low level, a light source capable of emitting light efficiently needs to be used, as well as the backlight-unit illumination light needs to pass efficiently through the liquid-crystal display panel. These are grave problems to be solved. As such a light source, instead of a conventionally-used cold-cathode fluorescent tube, a light-emitting diode has been considered and already used in practice. However, numerous light-emitting diodes are necessary for obtaining illumination light which has a large area and a high intensity. Hence, an adequate reduction in the power consumption cannot be realized, though the range of color reproduction is enlarged to enhance the picture quality.

Therefore, as an important task, an art has to be developed of not wasting the illumination light of a backlight unit and allowing this illumination light to efficiently pass through a liquid-crystal display panel. In a liquid crystal display, illumination light projected from a backlight unit passes through the polarizing plate of a liquid-crystal display panel. Thereby, only half the quantity of light radiated from a light source is effectively used in practice. Hence, if illumination light polarized in advance passes through the polarizing plate, the illumination light could be efficiently used.

On the basis of this approach, as a first prior art, a configuration is disclosed in which the formation of a luminous layer and a waveguide is devised so that a polarized beam which can pass through a polarizing plate of a liquid-crystal display panel which forms a part of a liquid crystal display can be securely taken out beforehand from a light-emitting diode element (e.g., refer to Japanese Patent Laid-Open No. 2006-134975 specification). In this method, from the light-emitting diode element, a polarized beam whose wave is strongly polarized in parallel with the luminous layer and in the direction perpendicular to the emission direction from this element can be taken out. Therefore, effectively-used light which passes through the polarizing plate of the liquid-crystal display panel can be used at an efficiency of approximately 1.92 times as high as that of the case where random light is used. This would help reduce the power consumption of the liquid crystal display.

Furthermore, as a second prior art, a method is presented for heightening the usage efficiency of a light source by allowing the polarization-axis angle of a totally polarized beam or a partially polarized beam emitted from a backlight unit to coincide with the transmission-axis angle of a polarizing plate on the backside of a liquid-crystal display panel (e.g., refer to Japanese Patent Laid-Open No. 2005-242177 specification). Specifically, in a liquid crystal display according to any prior art, interfacial reflection or refraction is used when a beam of light emitted from a cold-cathode fluorescent tube or the like is converted into a surface-type beam of light. Thereby, a beam of light emitted from a backlight unit becomes not a natural beam but a totally polarized beam or a partially polarized beam.

Consequently, the angular relation between the polarization-axis angle of the totally polarized beam or the polarization-axis angle of the partially polarized beam's polarization component and the transmission-axis angle of the polarizing plate on the backside of the liquid-crystal display panel makes a difference in the quantity by which a beam of light from the backlight unit passes through the rear polarizing plate. This greatly affects the usage efficiency of a beam of light emitted from the backlight unit. On the other hand, in the illumination light, if the difference between the polarization-axis angle of the totally polarized beam or the polarization-axis angle of the partially polarized beam's polarization component and the transmission-axis angle of the polarizing plate is set within ten degrees, then the light source's usage efficiency could be enhanced.

Moreover, as a third prior art, a surface illumination apparatus is given which includes: a reflection mirror disposed opposite to a substrate; a point light source disposed sideward from this mirror; and an optical system that allows a beam of light from this point light source to turn into a parallel beam, go straight in parallel with the substrate and be incident on the reflection mirror, in which the parallel beam is reflected by the reflection mirror and is incident perpendicularly to a liquid-crystal cell portion (e.g., refer to Japanese Patent Laid-Open No. 10-104617 specification). According to this configuration, using the optical system, a beam of light emitted from the point light source is turned into a parallel beam. Hence, this parallel beam has an oblique light component less than any conventional one, thus helping heighten the usage efficiency of a beam of light and reduce the power consumption.

In addition, as a fourth prior art, another surface illumination apparatus is known which includes: a light source portion which emits illumination light with uniformly kept substantially-linearly polarized; and a light guide portion which allows the illumination light emitted from this light source portion to be incident on an incidence portion and emit this illumination light as surface light-source light from an emission portion, in which the incidence portion has a smaller area than the emission portion, and the light guide portion emits the illumination light incident on the incidence portion without changing its polarization state (e.g., refer to Japanese Patent Laid-Open No. 2006-202703 specification). According to this configuration, the usage efficiency of a beam of light becomes higher so that high-intensity illumination light can be emitted.

Furthermore, as a fifth prior art, a method is also disclosed for obtaining a high-definition and high-precision collimating plane light source, simply using a single laser beam (e.g., refer to Japanese Patent Laid-Open No. 2002-169480 specification). Specifically, it is configured by: a laser light source which has a predetermined emission width; a reflection member which reflects a beam emitted from this laser light source substantially in parallel in a predetermined direction; and a polarization member which includes a polarization plane that reflects the beam reflected by this reflection member in a substantially perpendicular direction to its parallel plane. According to this configuration, the collimating plane light source formed by only one laser beam can be obtained using a simple configuration. This makes it possible to obtain a liquid crystal display which has a high definition and a high efficiency.

However, in the above described first prior art, although the beam of a backlight unit is polarized in advance and is incident in the polarization direction of the polarizing plate, in this example, the light-emitting diode element is characterized by having a structure for strongly linearly-polarizing the beam. Hence, only a general configuration is described about a light guide plate.

In addition, in the second prior art, in the case where a natural beam is used, when it is reflected or refracted inside of a light guide plate, a beam of light emitted from the cold-cathode fluorescent tube or the like becomes a totally polarized beam or a partially polarized beam. Using this, the beam's usage efficiency can be improved. However, neither description nor suggestion is given about, in the case where an intrinsically polarized one such as a laser beam is used, emitting a parallel beam perpendicularly from a main surface with kept polarized.

Furthermore, in the third prior art, a beam of light emitted from the point light source is turned into a parallel beam by the optical system, is incident parallel to a liquid-crystal display panel and is incident perpendicularly to the liquid-crystal display panel by the reflection mirror. According to this configuration, however, because the reflection mirror is used, in the case where it is applied to a large-area liquid-crystal display panel, there is a disadvantage in that the surface illumination apparatus becomes thicker.

Moreover, in the fourth prior art, using the light source portion which emits linearly-polarized illumination light, the illumination light is incident on the end part of a light guide plate, and the illumination light at a high parallel level is emitted from a main surface. According to this configuration, however, it is characterized by including a group of several grooves on the backside of the light guide plate and emitting the illumination light in the light guide plate's normal direction by this groove group. However, in this example, the illumination light emitted from the light source portion is not a parallel beam, which requires optimizing the light guide plate's groove-group shape according to the optical-path length of the illumination light incident through its end part. Hence, a disadvantage arises in that the cost of producing the light guide plate increases.

In addition, in the fifth prior art, a parallel laser beam incident on the end part of a light guide plate partly passes through a half mirror provided inside of the light guide plate, and the rest is emitted substantially perpendicularly to the light guide plate's main surface. However, in order to emit illumination light having a uniform intensity from the main surface, a large number of half mirrors have to be arranged, as well as the transmittance of each such mirror needs to be gradually varied. This raises a disadvantage in that the production of the light guide plate including the half mirrors becomes complicated to increase its cost.

As described so far, in the prior arts, neither description nor suggestion is given about, using a laser light source, simplifying the configuration of a light guide plate, and simultaneously, preserving the polarization of a beam of light and allowing a parallel beam to irradiate a liquid-crystal display panel. Hence, they are still insufficient in performance and costs. Particularly, in recent years, in terms of a laser light source with a red beam (or R-beam), a green beam (or G-beam) and a blue beam (or B-beam), a high-power one has also been realized. This presents a desire for the development of a backlight unit which is capable of enhancing the usage efficiency of a beam of light using a laser light source.

SUMMARY OF THE INVENTION

It is an object of the present invention to provide a surface illumination apparatus which is capable of preserving the polarization of a laser beam and using the laser beam more efficiently, and a liquid crystal display provided with this.

A surface illumination apparatus according to an aspect of the present invention, comprising: a laser light source which emits a substantially parallel laser beam; and a light guide plate which includes first and second main-surface portions and a first end-surface portion located in an end part of the first and second main-surface portions, wherein a laser beam emitted from the laser light source: is incident at an inclination angle to the first main-surface portion upon the first end-surface portion; is incident on the second main-surface portion after the direction of an optical path thereof is changed by the first main-surface portion; and is emitted as a substantially parallel beam with kept polarized from the second main-surface portion.

According to the surface illumination apparatus according to the present invention, a laser beam is incident on a liquid-crystal display panel with this laser beam's polarization preserved, so that the laser beam can be more efficiently used. This offers a great advantage in that a liquid crystal display provided with this surface illumination apparatus as a backlight unit is capable of realizing a high intensity and a low-level power consumption.

These and other objects, features and advantages of the present invention will become more apparent upon reading of the following detailed description along with the accompanied drawings.

DESCRIPTION OF THE PREFERRED EMBODIMENTS

Figure 1:
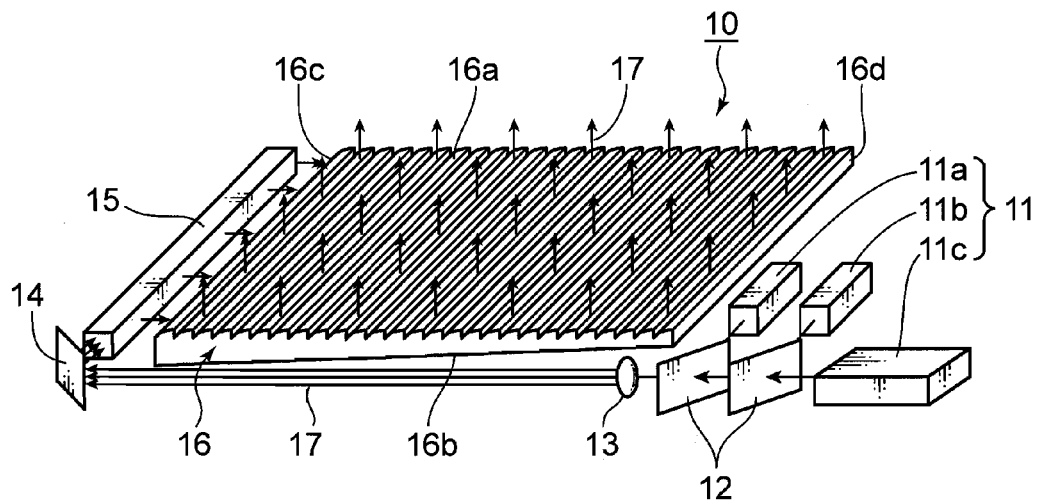
FIG. 1 is a schematic perspective view of a surface illumination apparatus according to a first embodiment of the present invention, showing its configuration.

Hereinafter, embodiments of the present invention will be described with reference to the drawings. Herein, identical component elements are given the same reference characters and numerals, and thus, their description is omitted in some cases. In some figures, aiming at grasping them easily, a surface illumination apparatus and a liquid-crystal display panel are enlarged in their longitudinal directions. Hence, the measurements or the like of the liquid-crystal display panel and the surface illumination apparatus are not exactly shown in an accurate manner.

First Embodiment

Figure 2:
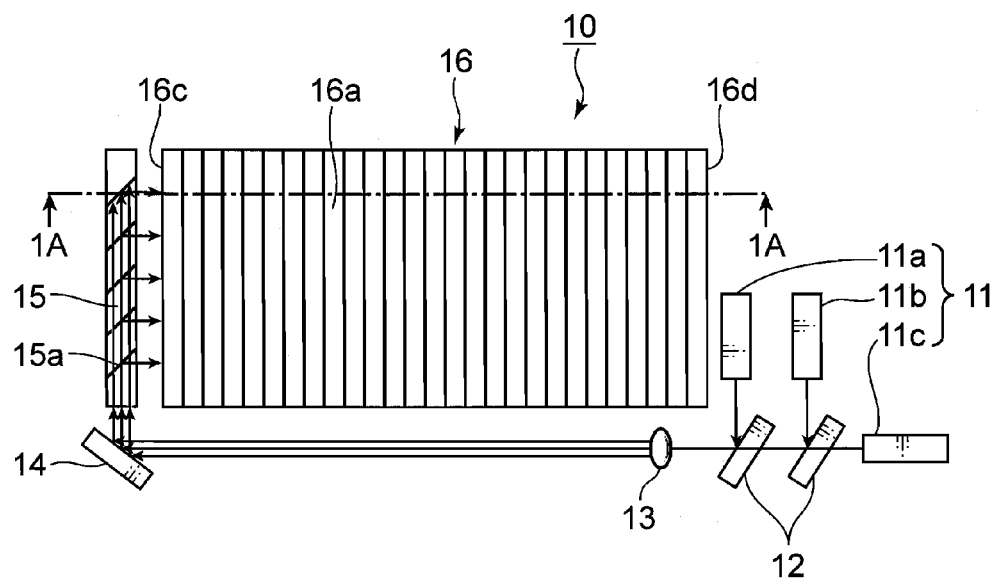
FIG. 2 is a plan view of the surface illumination apparatus, seen from the side of one main-surface portion of a light guide plate shown in FIG. 1.
Figure 3:
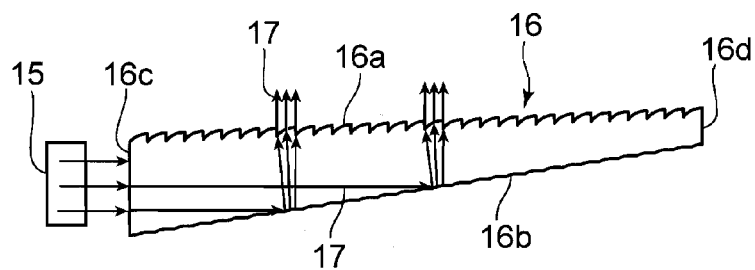
FIG. 3 is a schematic sectional view of the surface illumination apparatus, cut off along a 1A-1A line shown in FIG. 2.

FIG. 1 is a schematic perspective view of a surface illumination apparatus 10 according to a first embodiment of the present invention, showing its configuration. FIG. 2 is a plan view of the surface illumination apparatus 10, seen from the side of one main-surface portion 16a of a light guide plate 16 shown in FIG. 1. FIG. 3 is a schematic sectional view of the surface illumination apparatus 10, cut off along a 1A-1A line shown in FIG. 2. In FIG. 1 to FIG. 3, each member is arranged apart from each other for the purpose of helping understand their configurations. However, in the actual configurations, each member is disposed on a base plate (not shown) or the like, and all the members are united and fixed.

Figure 4:
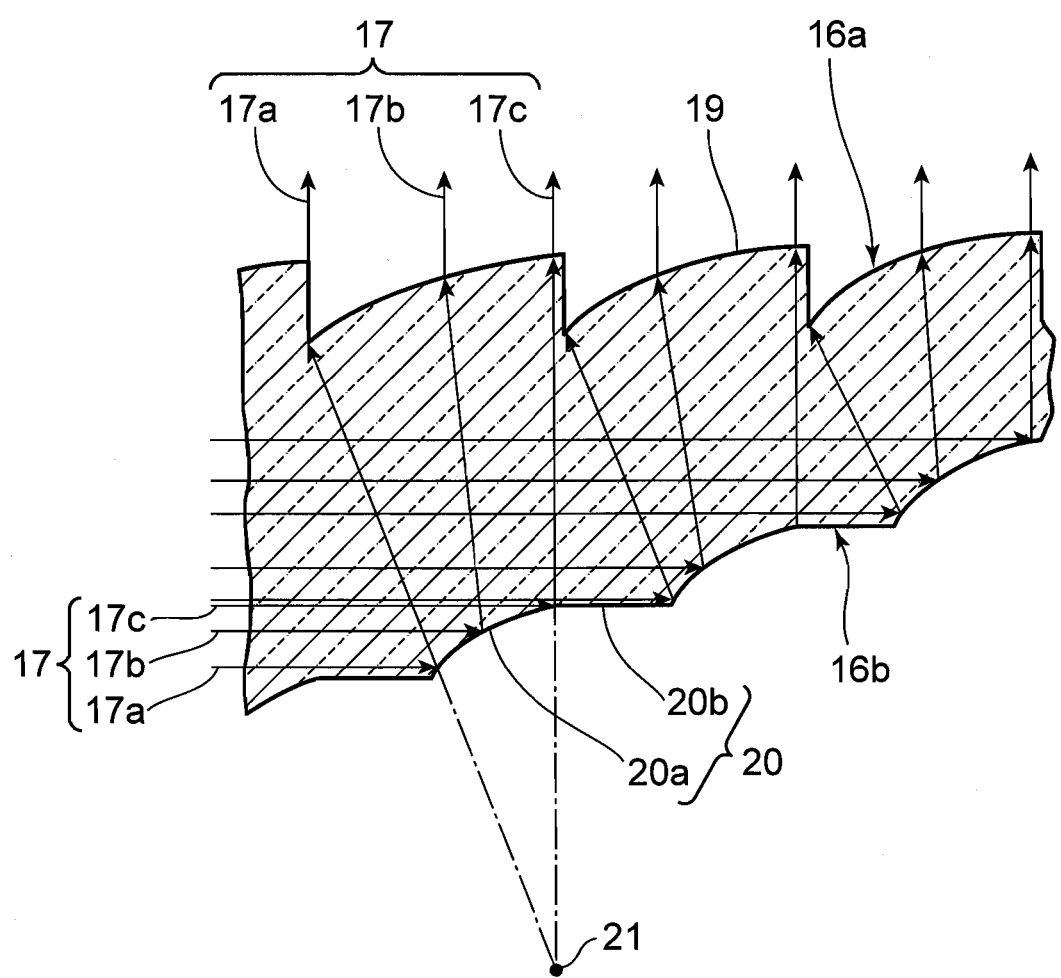
FIG. 4 is an enlarged sectional view of the light guide plate, showing illustratively that a laser beam incident from an end-surface light-guide plate is reflected by the other main-surface portion inside of the light guide plate and is emitted from the one main-surface portion, according to the first embodiment.

FIG. 4 is an enlarged sectional view of the board-shaped light guide plate 16, showing illustratively that a laser beam 17 incident from an end-surface light-guide plate 15 is reflected by the other main-surface portion 16b inside of the light guide plate 16 and is emitted from the one main-surface portion 16a, according to the first embodiment. Hereinafter, on the basis of these figures, the configuration will be described of the surface illumination apparatus 10 according to this embodiment.

As shown in FIG. 1 to FIG. 3, the surface illumination apparatus 10 according to this embodiment has the following configuration. Specifically, the surface illumination apparatus 10 according to this embodiment includes, as its basic configuration: a laser light source 11 which emits a substantially parallel beam; and the light guide plate 16 which has an end-surface portion 16c (i.e., the first end-surface portion) shaped like a long and narrow rectangle and a rectangular main-surface portion 16a on one side thereof. The laser beam 17 emitted from the laser light source 11 is incident on the end-surface portion 16c and is emitted from the one main-surface portion 16a. Specifically, the laser beam 17 is incident through the end-surface portion 16c at an inclination angle to a rectangular main-surface portion 16b (i.e., the first main-surface portion) on the other side which faces the one main-surface portion 16a (i.e., the second main-surface portion) of the light guide plate 16. Then, its optical path's direction is changed by the other main-surface portion 16b and it is incident on the one main-surface portion 16a. Lastly, it is emitted as a substantially parallel beam from the one main-surface portion 16a.

In this embodiment, the substantially parallel beam means, for example, that the emission direction of a laser beam emitted from the one main-surface portion 16a is within ±5 degrees. Further, it means, more desirably, that the laser beam should be emitted perpendicularly to the one main-surface portion 16a and within ±5 degrees. In this case, as the incidence-angle dependency of an optical element such as a dichroic mirror and a partially transmissive mirror, a substantially flat reflectance or transmittance can be obtained. The same range is also applied to any other cases.

In the light guide plate 16, the other main-surface portion 16b is disposed so as to incline in the direction where the light guide plate 16 becomes thinner from the end-surface portion 16c corresponding to the incidence plane of the laser beam 17 toward an end-surface portion 16d (i.e., the second end-surface portion) on the other side which faces this end-surface portion 16c. The other main-surface portion 16b is formed with a plural of curved-surface portions 20 (i.e., the first curved-surface portions) from the end-surface portion 16c toward the other end-surface portion 16d. It reflects the laser beam 17 incident on the end-surface portion 16c toward the one main-surface portion 16a. On the other hand, the one main-surface portion 16a is formed with a plural of curved-surface portions (i.e., the second curved-surface portions) 19 in the position corresponding to the curved-surface portions 20 formed in the other main-surface portion 16b. The curved-surface portion 19 has a curvature for emitting the laser beam 17 reflected by the curved-surface portion 20 of the other main-surface portion 16b as the substantially parallel beam from the one main-surface portion 16a. Therefore, in the light guide plate 16, the direction of the optical path is changed by the curved-surface portions 19 and 20 formed in the one main-surface portion 16a and the other main-surface portion 16b. This makes it possible to emit the laser beam 17 as the substantially parallel beam from the one main-surface portion 16a.

Next, the configuration of the curved-surface portions 19 and 20 will be described in further detail. In the other main-surface portion 16b of the light guide plate 16, the curved-surface portion 20 which reflects the laser beam 17 incident through the end-surface portion 16c toward the one main-surface portion 16a has a plurality of rows perpendicular to the laser beam 17's advance direction from the end-surface portion 16c toward the end-surface portion 16d. On the other hand, in the one main-surface portion 16a, the curved-surface portion 19 which has a curvature for emitting the laser beam 17 reflected by the curved-surface portion 20 formed in the other main-surface portion 16b as the substantially parallel beam from the one main-surface portion 16a is formed in the position corresponding to the curved-surface portion 20 of the other main-surface portion 16b.

Furthermore, in this embodiment, the laser light source 11 is made up of an R-light source 11a, a G-light source 11b and a B-light source 11c which emit each of an R-beam, a G-beam and a B-beam with the three primary colors. These are designed to emit a substantially parallel beam having a predetermined polarization. The laser beams with each wavelength are combined by a dichroic mirror 12, and thereafter, using a beam expander 13, it is expanded so as to have substantially the same size as the end-surface part of the end-surface light-guide plate 15. Then, the laser beam 17 reaches, via a reflection mirror 14, the end-surface part of the end-surface light-guide plate 15. It is incident on the end-surface light-guide plate 15 and comes into it. In this embodiment, the above described dichroic mirror 12 is equivalent to the laser combining portion.

Moreover, the end-surface light-guide plate 15 is provided with a plurality of partially transmissive mirrors 15a at regular pitches. A part of the laser beam 17 incident with a certain expansion is reflected by a first partially transmissive mirror 15a and is incident on the end-surface portion 16c of the light guide plate 16. The rest is incident on the next partially transmissive mirror 15a. By this partially transmissive mirror 15a, in the same way, a part of it is reflected and is incident on the end-surface portion 16c of the light guide plate 16. The rest is incident on the succeeding partially transmissive mirror 15a. Sequentially, this is repeated one after another and the whole of the last incident laser beam is reflected by the last partially transmissive mirror 15a. This helps allow a uniform and substantially parallel beam to be incident, from the end-surface light-guide plate 15, upon the end-surface portion 16c of the light guide plate 16 over its entire surface.

According to this configuration, the laser beam 17 as a substantially parallel beam having a predetermined polarization is incident through the end-surface portion 16c of the light guide plate 16 substantially in parallel with the one main-surface portion 16a of the light guide plate 16. Then, it is reflected by the curved-surface portions 20 formed in the other main-surface portion 16b. This reflected laser beam 17 is incident on the curved-surface portions 19 formed in the one main-surface portion 16a. Then, it is refracted by the curved-surface portions 19 to change its optical path's direction. As a result, with kept polarized, the substantially parallel laser beam 17 is emitted perpendicularly from the one main-surface portion 16a.

Therefore, the R-beam, the G-beam and the B-beam are each emitted as a mutually substantially-parallel beam with their polarization kept preserved. Thereby, if this surface illumination apparatus 10 is used as a backlight unit for a liquid crystal display as mentioned later, a linear polarized light can be incident substantially perpendicularly upon a liquid-crystal display panel. This makes it possible to remove a polarizing plate ordinarily provided on the side of the backlight unit. Consequently, the laser beam 17 can be efficiently introduced into the liquid-crystal display panel, thus reducing the power consumption and heightening the intensity.

Incidentally, the curved-surface portion 20 formed in the other main-surface portion 16b is a reflection mirror, and thus, it is formed, for example, with a reflection film (not shown) made of aluminum (or Al). In contrast, the curved-surface portion 19 formed in the one main-surface portion 16a is formed on the interface between the light guide plate 16 and an air layer. Hence, in this curved-surface portion 19, the laser beam 17 is projected into the air layer after being refracted according to the difference in refractive index.

Specifically, as shown in FIG. 4, the combined laser beam 17 is reflected based on the curved-surface shape of the curved-surface portion 20 formed in the other main-surface portion 16b. This curved-surface portion 20 is made up of: a continuous curved surface 20a which has a continuous curvature for reflecting the laser beam 17 emitted from the end-surface light-guide plate 15 so that it is incident on the curved-surface portion 19 formed in the one main-surface portion 16a; and a parallel plane 20b which is almost parallel to the laser beam 17's advance direction so as not to reflect it.

For example, in the laser beam 17 incident through the end-surface portion 16c, a laser beam 17a incident from a specific position is incident on the lowermost part of the continuous curved surface 20a of the curved-surface portion 20. Then, its reflected beam is, as shown in FIG. 4, upon the left-end part of the curved-surface portion 19 of the one main-surface portion 16a. A laser beam 17b incident from a specific position is incident on the middle part of the continuous curved surface 20a of the curved-surface portion 20. Then, its reflected beam is, as shown in FIG. 4, upon the middle part of the curved-surface portion 19 of the one main-surface portion 16a. In the same way, a laser beam 17c incident from a specific position is incident on the uppermost part of the continuous curved surface 20a of the curved-surface portion 20. Then, its reflected beam is, as shown in FIG. 4, upon the right-end part of the curved-surface portion 19 of the one main-surface portion 16a.

Incidentally, this curved-surface portion 20's shape is not limited to the above described shape, and thus, any optimum shape can be selected according to the light guide plate 16's thickness, size, material or the like. For example, without providing the parallel plane 20b or the like, it may be shaped like a continuous curved surface as a whole. Or, it can also have a continuous curved-surface shape over its entire part which is formed by connecting minute planes continuously.

In this way, the curved-surface portion 20 formed in the other main-surface portion 16b is configured so that the laser beam 17 is reflected to a predetermined position of the curved-surface portion 19 formed in the one main-surface portion 16a. In contrast, the curved-surface portion 19 formed in the one main-surface portion 16a is shaped like a lens whose focal point coincides with an intersection point 21 of the optical-axis extension parts of the laser beams 17 reflected by the curved-surface portion 20. According to this configuration, the laser beam 17a, 17b and 17c becomes substantially parallel when emitted from the one main-surface portion 16a. At this time, if the curved-surface portions 19 and 20 which are formed in the one main-surface portion 16a and the other main-surface portion 16b, respectively, are properly designed, then the laser beam 17 emitted from the one main-surface portion 16a can be perpendicular to the one main-surface portion 16a of the light guide plate 16.

The light guide plate 16 configured like this can be made of a resin material which is transparent and has an excellent optical characteristic or molding property. Particularly, it is preferable that an acrylic resin or a polyolefin-system resin be used which generates less double refraction.

The laser beam 17 used in the surface illumination apparatus 10 according to this embodiment is not limited especially to the above described example. It may be a mixture of beams emitted from the R-light source 11a, the G-light source 11b and the B-light source 11c. Or, its light source may also be one of the R-light source 11a, the G-light source 11b and the B-light source 11c, or include another light source for a different wavelength.

The surface illumination apparatus 10 configured like this can emit a large-area and uniform-intensity laser beam, without thickening the light guide plate 16. For example, if it is used as a backlight unit for a liquid crystal display, the usage efficiency of light and the reproducibility of color can be improved. This helps produce a great effect on a reduction in the power consumption and an improvement in the picture quality.

Figure 5:
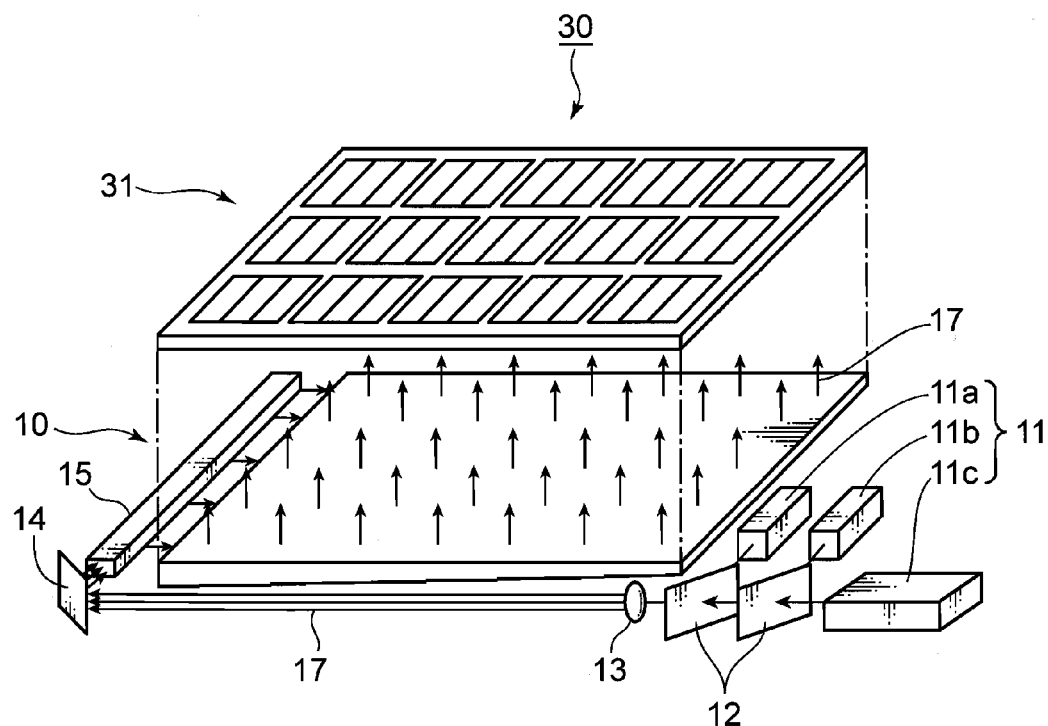
FIG. 5 is a schematic perspective view of a liquid crystal display provided with the surface illumination apparatus according to the first embodiment as a backlight unit, showing its configuration.
Figure 6:
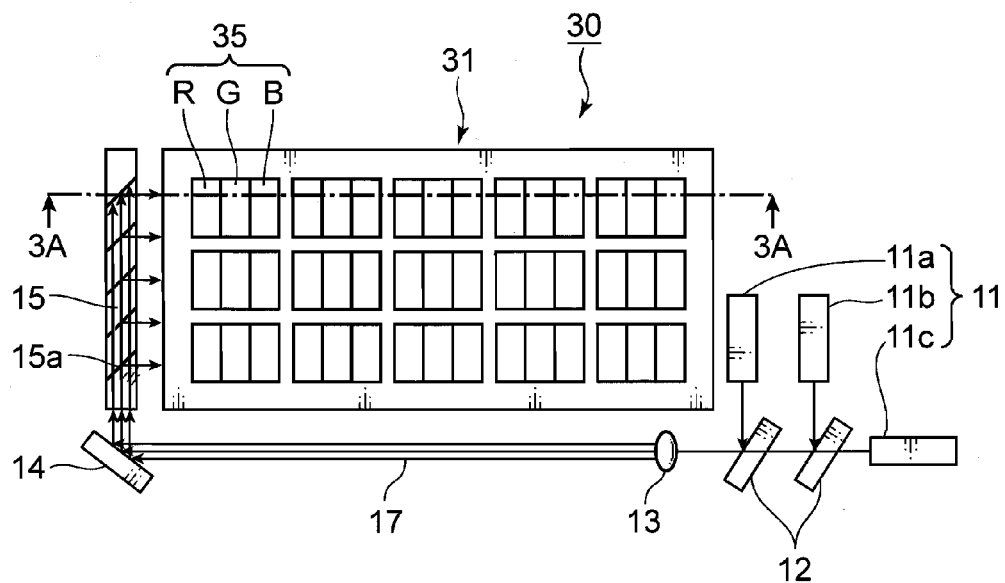
FIG. 6 is a plan view of the liquid crystal display, seen from the side of a liquid-crystal display panel shown in FIG. 5.
Figure 7:
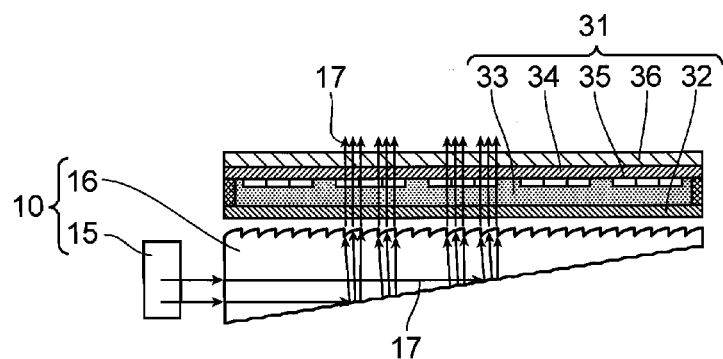
FIG. 7 is a schematic sectional view of the liquid crystal display, cut off along a 3A-3A line shown in FIG. 6.
Figure 8:
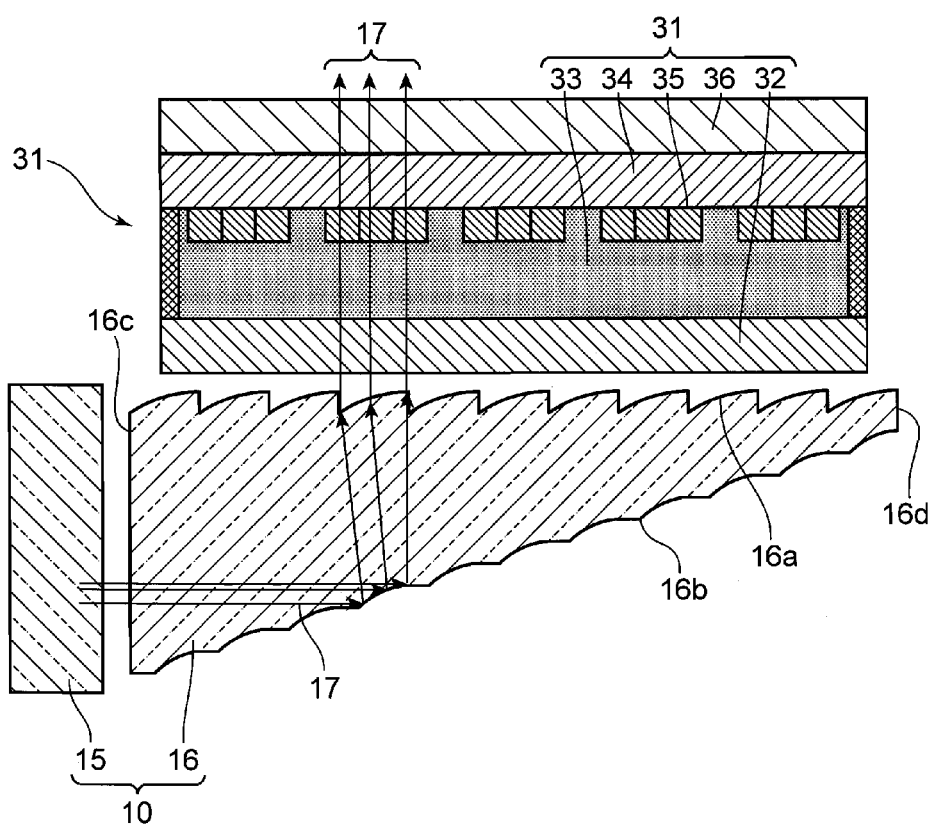
FIG. 8 is a schematic sectional view of the surface illumination apparatus and the liquid-crystal display panel, showing the optical path of a laser beam from the former to the latter, according to the first embodiment.

FIG. 5 is a schematic perspective view of a liquid crystal display 30 provided with the surface illumination apparatus 10 according to this embodiment as a backlight unit, showing its configuration. FIG. 6 is a plan view of the liquid crystal display 30, seen from the side of a liquid-crystal display panel 31 shown in FIG. 5. FIG. 7 is a schematic sectional view of the liquid crystal display 30, cut off along a 3A-3A line shown in FIG. 6. FIG. 8 is a schematic sectional view of the surface illumination apparatus 10 and the liquid-crystal display panel 31, showing the optical path of a laser beam from the former to the latter. Hereinafter, the configuration of the liquid crystal display 30 provided with the surface illumination apparatus 10 according to this embodiment will be described with reference to FIG. 5 to FIG. 8.

The liquid crystal display 30 includes the liquid-crystal display panel 31, and a backlight unit 10 which illuminates this liquid-crystal display panel 31 according to this embodiment. This backlight unit 10 is equivalent to the above described surface illumination apparatus 10. Hereinafter, this surface illumination apparatus 10 will be described as the backlight unit 10.

In this embodiment, the liquid-crystal display panel 31 is configured so that no polarizing plate is provided between the backlight unit 10 and the liquid-crystal display panel 31 and the laser beam 17 for illuminating the liquid-crystal display panel 31 is incident on the liquid-crystal display panel 31, without passing through any polarizing plate. Specifically, the backlight unit 10 and the liquid-crystal display panel 31 are arranged so that the polarization-axis angle of the laser beam 17 emitted from the backlight unit 10 becomes a predetermined angle with respect to the polarization-axis angle of a polarizing plate 36 disposed on the view side of the liquid-crystal display panel 31.

The laser beam 17 emitted from the one main-surface portion 16a of the light guide plate 16 is a beam of light formed by combining the R-beam, the G-beam and the B-beam, and such a beam is linearly polarized. Hence, if the liquid-crystal display panel 31 and the backlight unit 10 are arranged so that the polarization inclination becomes a value set in advance with respect to the orientation direction of a liquid crystal 33 of the liquid-crystal display panel 31 and the polarizing plate 36 disposed on the view side, there is no need for any polarizing plate on the side of the backlight unit 10.

For example, if the liquid-crystal display panel 31 and the surface illumination apparatus 10 are arranged so that with applying no voltage to the liquid crystal 33, a beam of light from the backlight unit 10 passes through the liquid crystal 33 as well as the polarizing plate 36, then a normally white display appears. If a voltage is given to the liquid crystal 33, the laser beam 17 stops passing through the liquid crystal 33 so that a black display appears. In contrast, if the liquid-crystal display panel 31 and the surface illumination apparatus 10 are arranged so that with applying no voltage to the liquid crystal 33, the beam of light from the backlight unit 10 is cut off by the liquid crystal 33, then a normally black display appears. If a voltage is given to the liquid crystal 33, the laser beam 17 passes through the liquid crystal 33 as well as the polarizing plate 36, so that a white display is obtained.

In this way, in the liquid crystal display 30 provided with the surface illumination apparatus 10 according to this embodiment as its backlight unit, no polarizing plate is provided on the side of the backlight unit 10. Therefore, the laser beam 17 emitted from the laser light source 11 can be efficiently incident on the liquid-crystal display panel 31. This makes it possible to realize a high intensity and a low-level power consumption.

By the way, the liquid-crystal display panel 31 has a transmission-type or semi-transmission-type formation, and for example, it has a TFT active-matrix-type formation. In its display area, as shown in FIG. 6, many pixels 35 which are each made up of a red pixel portion (or R-sub-pixel) R, a green pixel portion (or G-sub-pixel) G and a blue pixel portion (or B-sub-pixel) B are provided in a matrix form. It is driven by a TFT. Between two glass substrates 32 and 34, the liquid crystal 33 is disposed, and the TFT for driving the liquid crystal 33 is formed in either of the glass substrates 32 and 34, but it is not shown in any figures. This liquid-crystal display panel 31 has a conventionally-used configuration, which is formed only by removing a polarizing plate on the side of the backlight unit 10, and thus, a further description is omitted.

In the above described liquid crystal display 30, the surface illumination apparatus 10 according to this embodiment is used as the backlight unit 10. Therefore, the usage efficiency of light can be improved and the reproducibility of color can be improved, and a high intensity and a low-level power consumption can be realized. Besides, as the wavelength of light emitted by the R-light source 11a, the G-light source 11b and the B-light source 11c which make up the laser light source 11, the purity of color becomes extremely good. This helps enlarge the range of color reproduction drastically. As a result, an image can be displayed with a picture quality higher than that of a system in which a conventional cold-cathode fluorescent tube or an LED light source is used.

Second Embodiment

Figure 9:
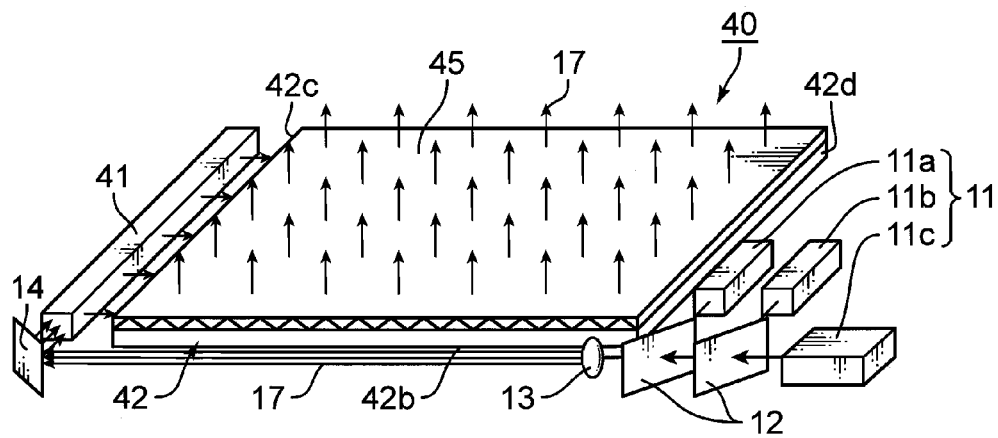
FIG. 9 is a schematic perspective view of a surface illumination apparatus according to a second embodiment of the present invention, showing its configuration.
Figure 10:
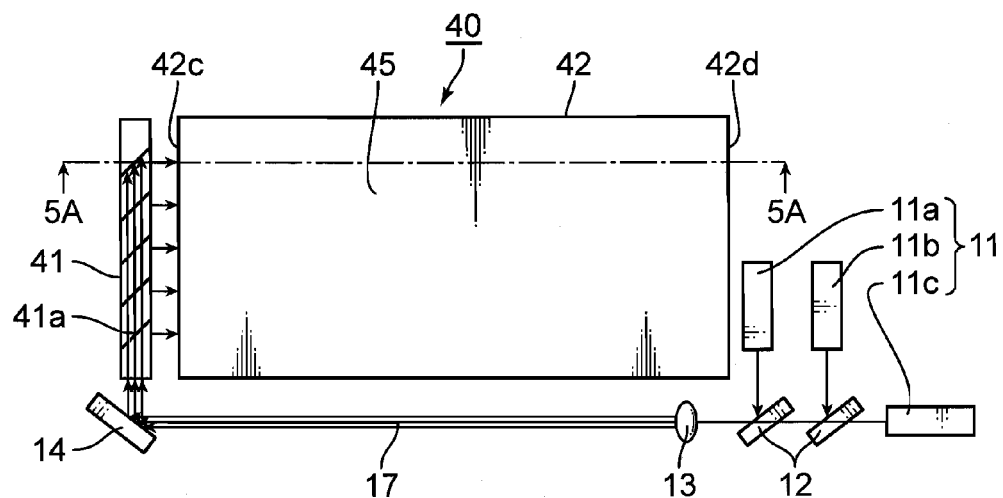
FIG. 10 is a plan view of the surface illumination apparatus, seen from the side of a prism sheet disposed over a light guide plate shown in FIG. 9.
Figure 11:
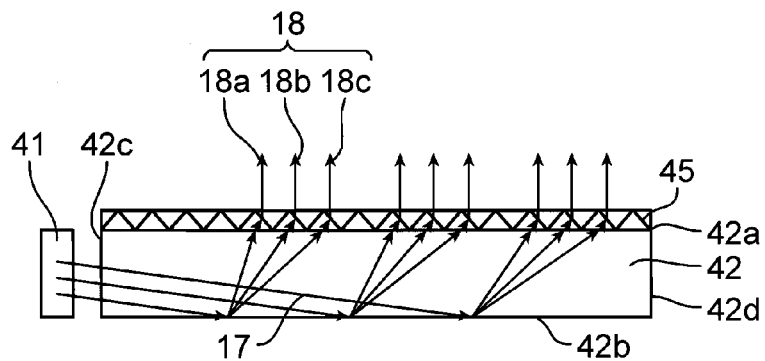
FIG. 11 is a schematic sectional view of the surface illumination apparatus, cut off along a 5A-5A line shown in FIG. 10.

FIG. 9 is a schematic perspective view of a surface illumination apparatus 40 according to a second embodiment of the present invention, showing its configuration. FIG. 10 is a plan view of the surface illumination apparatus 40, seen from the side of a prism sheet 45 disposed over a light guide plate 42 shown in FIG. 9. FIG. 11 is a schematic sectional view of the surface illumination apparatus 40, cut off along a 5A-5A line shown in FIG. 10. In FIG. 9 to FIG. 11, each member is arranged apart from each other for the purpose of helping understand their configurations. However, in the actual configurations, each member is disposed on a base plate (not shown) or the like, and all the members are united and fixed.

Figure 12:
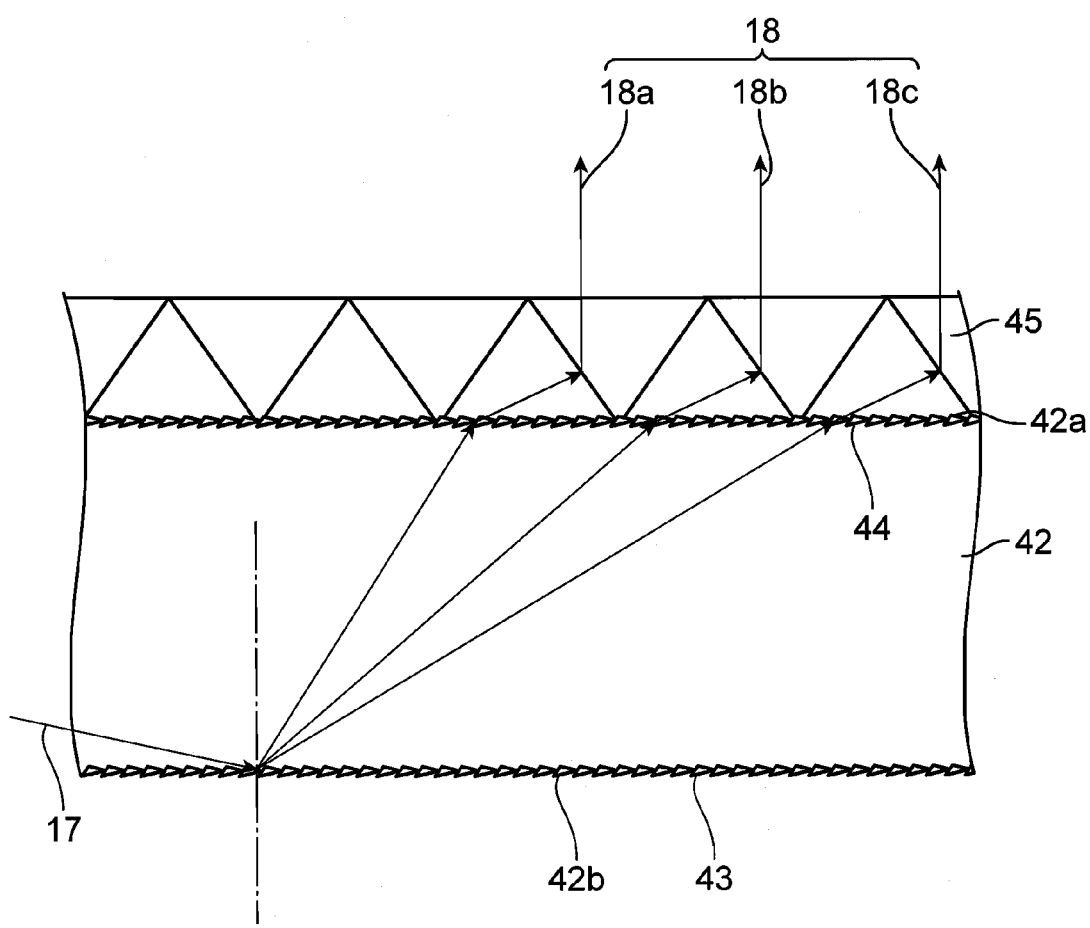
FIG. 12 is a sectional view of the light guide plate, showing illustratively that a laser beam incident from an end-surface light-guide plate is diffracted in a main-surface portion on the other side and a main-surface portion on the one side, respectively, inside of the light guide plate, and thereafter, is further refracted by the prism sheet and is emitted as illumination light substantially perpendicularly to the one main-surface portion, according to the second embodiment.

FIG. 12 is a sectional view of the light guide plate, showing illustratively that the laser beam 17 incident from an end-surface light-guide plate 41 is diffracted in a main-surface portion 42b on the other side and a main-surface portion 42a on the one side, respectively, inside of the light guide plate 42, and thereafter, is further refracted by the prism sheet 45 and is emitted as illumination light 18 substantially perpendicularly to the one main-surface portion 42a. Hereinafter, using FIG. 9 to FIG. 12, a description will be given in detail.

As shown in FIG. 9 to FIG. 11, the surface illumination apparatus 40 according to this embodiment has the following configuration. Specifically, this surface illumination apparatus 40 includes, as its basic configuration: the laser light source 11; and the light guide plate 42 which the laser beam 17 emitted from the laser light source 11 is incident through an end-surface portion 42c upon and emits it from the one main-surface portion 42a. This light guide plate 42 has a uniform thickness between the one main-surface portion 42a and the other main-surface portion 42b.

As shown in FIG. 12, the other main-surface portion 42b is formed with a first diffraction grating 43 which has a lattice vector in the direction where the laser beam 17 incident through the end-surface portion 42c goes ahead. Similarly, the one main-surface portion 42a is formed with a second diffraction grating 44 which further diffracts monochromatic laser beams 18a, 18b and 18c diffracted by the first diffraction grating 43 formed in the other main-surface portion 42b and emits these beams as a substantially parallel beam.

In this embodiment, the laser beam 17 is formed by combining the R-beam, the G-beam and the B-beam with the three primary colors. Thus, it is separated into each color by the first diffraction grating 43, becomes the monochromatic laser beams 18a, 18b and 18c and is incident on the second diffraction grating 44 disposed in the one main-surface portion 42a. Besides, the combined laser beam 17 is incident upon the end-surface portion 42c, at an inclination angle to the other main-surface portion 42b. If its incidence angle to the other main-surface portion 42b narrows, that is advantageous for enlarging the area of the light guide plate 42. However, the incidence angle is restricted, depending upon the design of the first diffraction grating 43.

The monochromatic laser beams 18a, 18b and 18c formed through the diffraction and the color separation by the first diffraction grating 43 are diffracted by the second diffraction grating 44 disposed in the one main-surface portion 42a. Thereby, all of them are emitted in a certain substantially-parallel direction. Over the one main-surface portion 42a, the prism sheet (i.e., the optical-path change member) 45 is disposed. Through this prism sheet 45, and those monochromatic laser beams 18a, 18b and 18c are refracted and emitted as substantially parallel beams in a substantially perpendicular direction to the one main-surface portion 42a.

Specifically, in this embodiment, the first diffraction grating 43 has a pitch substantially equal to the second diffraction grating 44. Hence, regardless of each wavelength of the monochromatic laser beams 18a, 18b and 18c, the beams substantially parallel to each other can be emitted from the one main-surface portion 42a. Further, these substantially parallel beams are refracted by the prism sheet 45, so that the substantially parallel beams can be emitted with kept polarized, as described above, in the substantially perpendicular direction to the one main-surface portion 42a.

Likewise in this embodiment, the laser light source 11 is made up of the R-light source 11a, the G-light source 11b and the B-light source 11c which emit each of the R-beam, the G-beam and the B-beam with the three primary colors. The beams of light with these wavelengths are combined by the dichroic mirror 12, and thereafter, using the beam expander 13, it is expanded so as to have substantially the same size as the end-surface part of the end-surface light-guide plate 41. Then, the laser beam 17 reaches, via the reflection mirror 14, the end-surface part of the end-surface light-guide plate 41. It is incident on the end-surface light-guide plate 41 and comes into it. In this embodiment, the dichroic mirror 12 is equivalent to the laser combining portion. These are the same as the first embodiment, but in this embodiment, the end-surface light-guide plate 41's configuration is partly different from the first embodiment. Hence, this point will be described below.

In this embodiment, the end-surface light-guide plate 41 is provided with partially transmissive mirrors 41a at regular pitches. Each partially transmissive mirror 41a has such an inclination that when it reflects a part of the incident laser beam 17 and allows this part to be incident on the end-surface portion 42c of the light guide plate 42, it can be incident at a specific inclination angle to the other main-surface portion 42b.

Therefore, the part of the laser beam 17 incident with a certain expansion is reflected by a first partially transmissive mirror 41a and is incident with the specific inclination upon the end-surface portion 42c of the light guide plate 42. The rest is incident on the next partially transmissive mirror 41a. By this partially transmissive mirror 41a, in the same way, a part of it is reflected and is incident with the specific inclination upon the end-surface portion 42c of the light guide plate 42. The rest is incident on the succeeding partially transmissive mirror 41a. Sequentially, this is repeated one after another and the whole of the last incident laser beam 17 is reflected by the last partially transmissive mirror 41a. This helps allow a uniform and substantially parallel beam to be incident from the end-surface light-guide plate 41, with the specific inclination, upon the end-surface portion 42c of the light guide plate 42 over its entire surface.

According to this configuration, the laser beam 17 as a substantially parallel beam having a predetermined polarization is incident with the specific inclination upon the end-surface portion 42c of the light guide plate 42. Therefore, as described above, it undergoes a predetermined diffraction by the first diffraction grating 43 and the second diffraction grating 44 and is incident on the prism sheet 45. As the substantially-parallel illumination light 18, it is emitted while holding its polarization state.

Figure 13:
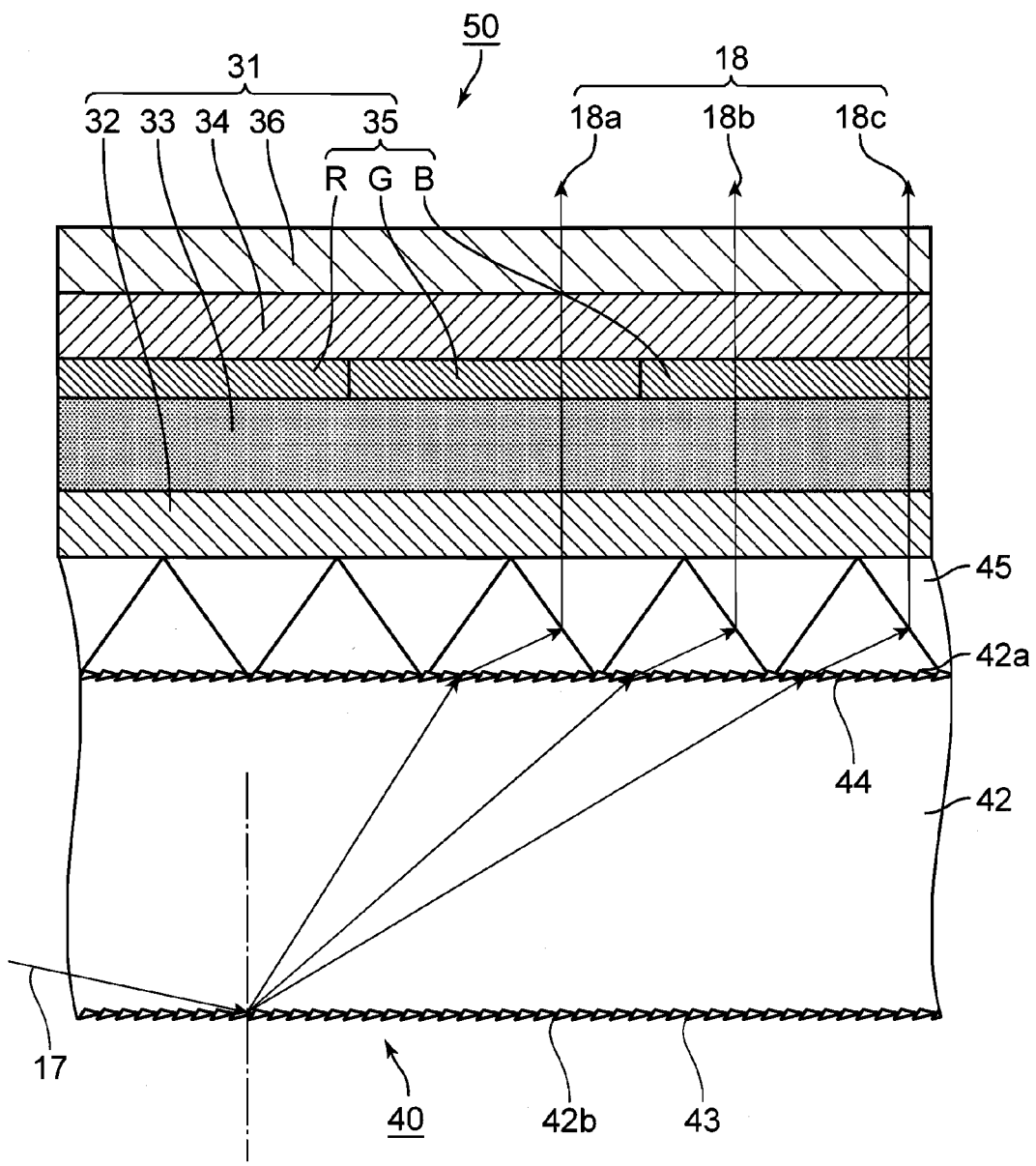
FIG. 13 is a schematic partially-sectional view of a liquid crystal display provided with the surface illumination apparatus according to the second embodiment as a backlight unit, illustrating its configuration and the optical path of a laser beam from the surface illumination apparatus to a liquid-crystal display panel.

FIG. 13 is a schematic partially-sectional view of a liquid crystal display 50 provided with the surface illumination apparatus 40 according to this embodiment as a backlight unit, illustrating its configuration and the optical path of a laser beam from the surface illumination apparatus 40 to a liquid-crystal display panel 31.

The liquid crystal display 50 according to this embodiment includes, in the same way as the liquid crystal display 30 according to the first embodiment, the liquid-crystal display panel 31, and a backlight unit 40 which illuminates this liquid-crystal display panel 31. This backlight unit 40 is equivalent to the above described surface illumination apparatus 40. In terms of its specific configuration or the like, it only differs in the surface illumination apparatus 40's configuration. Otherwise, it is the same as the liquid crystal display 30 according to the first embodiment, and thus, its description is omitted.

This liquid crystal display 50 alike is not provided with any polarizing plate on the side of the surface illumination apparatus 40 as a backlight unit. Thereby, the laser beam 17 emitted from the laser light source 11 can be efficiently incident on the liquid-crystal display panel 31. This makes it possible to realize a high intensity and a low-level power consumption. Besides, as the wavelength of light emitted by the R-light source 11a, the G-light source 11b and the B-light source 11c which make up the laser light source 11, the purity of color becomes extremely good. This helps enlarge the range of color reproduction drastically. As a result, an image can be displayed with a picture quality higher than that of a system in which a conventional cold-cathode fluorescent tube or an LED light source is used.

Third Embodiment

Figure 14:
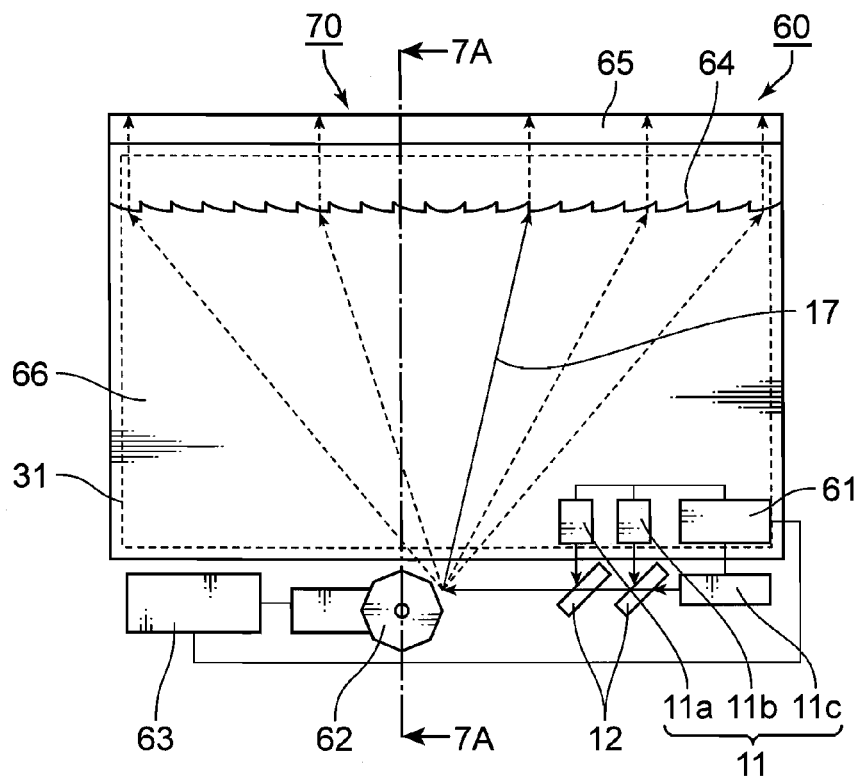
FIG. 14 is a plan view of a liquid crystal display provided with a surface illumination apparatus according to a third embodiment of the present invention, seen from the side of the surface illumination apparatus, showing its configuration.
Figure 15:
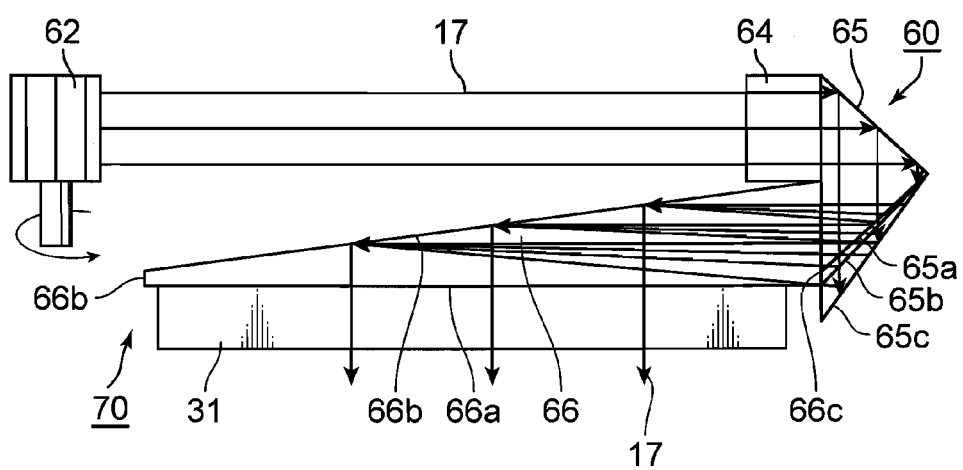
FIG. 15 is a schematic sectional view of the liquid crystal display, cut off along a 7A-7A line shown in FIG. 14.
Figure 16:
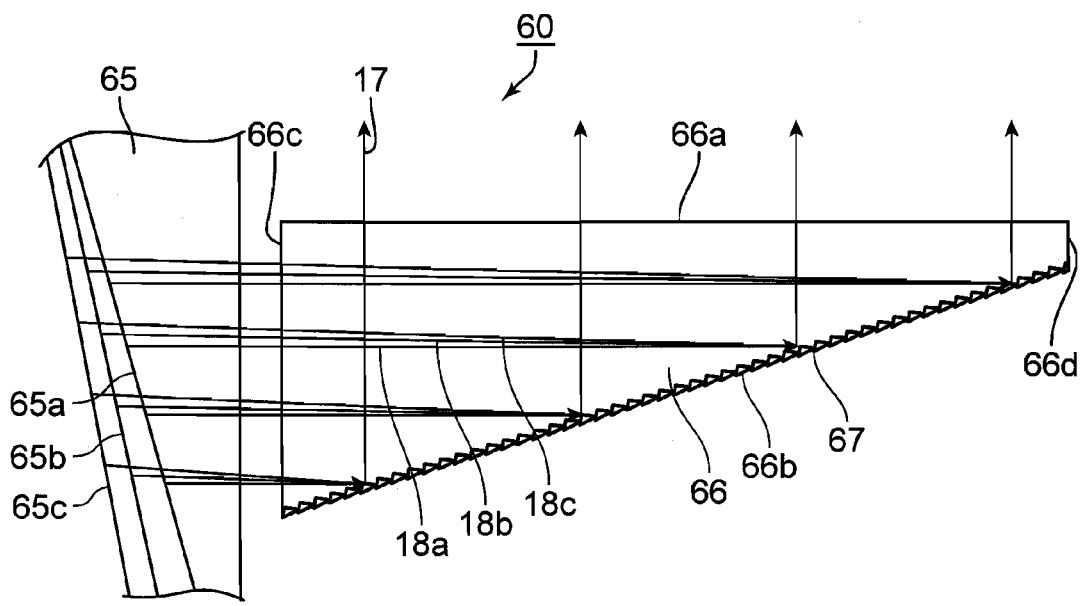
FIG. 16 is a sectional view of the surface illumination apparatus according to the third embodiment used as a backlight unit for the liquid crystal display, illustrating the configuration of its main part.
Figure 17:
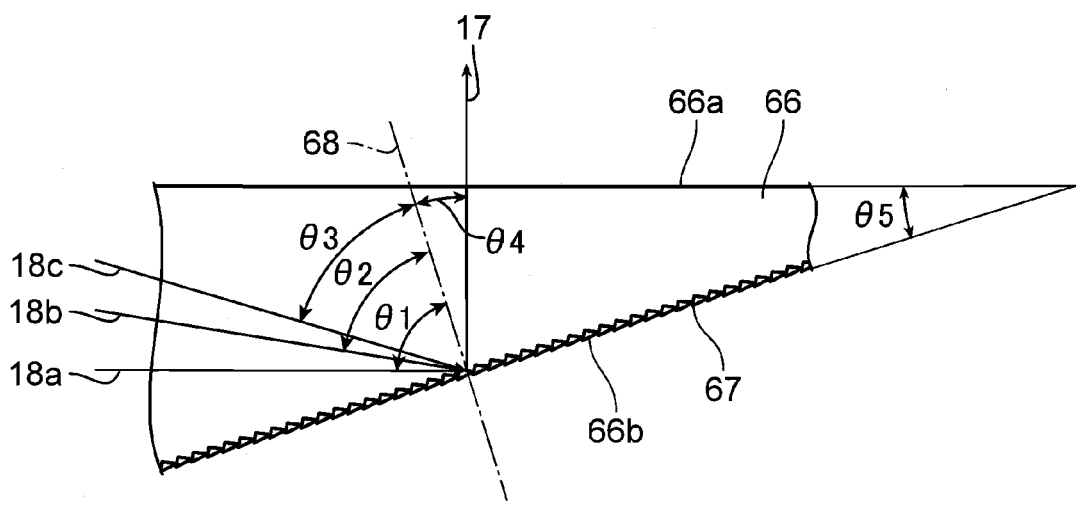
FIG. 17 is a sectional view of a light guide plate shown in FIG. 16, illustrating the optical path of a laser beam.

FIG. 14 is a plan view of a liquid crystal display 70 provided with a surface illumination apparatus 60 according to a third embodiment of the present invention, seen from the side of the surface illumination apparatus 60, showing its configuration. FIG. 15 is a schematic sectional view of the liquid crystal display 70, cut off along a 7A-7A line shown in FIG. 14. FIG. 16 is a sectional view of the surface illumination apparatus 60 used as a backlight unit for the liquid crystal display 70 shown in FIG. 14, illustrating the configuration of its main part. FIG. 17 is a sectional view of a light guide plate 66 shown in FIG. 16, illustrating the optical path of a laser beam. Hereinafter, this surface illumination apparatus 60 will be described as a backlight unit 60.

In the backlight unit 60 used in the liquid crystal display 70 according to this embodiment, a polygon mirror 62 is used as an optical system which allows a substantially parallel beam to be incident on an end-surface portion 66c of the light guide plate 66. Specifically, in this backlight unit 60, the combined laser beam 17 is reflected by the polygon mirror 62 (i.e., the second laser-beam scan portion). After this, it is incident on a cylindrical Fresnel lens 64 (i.e., the optical conversion member) having such a shape as shown in FIG. 14 while being scanned in the cylindrical Fresnel lens 64's longitudinal directions.

Herein, the laser beam 17 to be incident on the polygon mirror 62 is incident so as to sweep along the polygon mirror 62's mirror surface, so that it can be incident upon the cylindrical Fresnel lens 64, over its whole part in the width directions (i.e., the vertical directions to the paper surface of FIG. 14). Specifically, a laser-beam scan portion 61 (i.e., the first laser-beam scan portion) is provided which scans the laser beam 17 incident on the end-surface portion 66c in the light guide plate 66's thickness directions (i.e., the vertical directions to the paper surface of FIG. 14).

In the concrete, the laser light source 11 (i.e., the R-light source 11a, the G-light source 11b and the B-light source 11c) is supported so as to move in the light guide plate 66's thickness directions. Thus, the laser-beam scan portion 61 vibrates the laser light source 11 in the light guide plate 66's thickness directions. In this case, the laser beam 17 is vibrated, thus helping reduce the speckle noise.

By the way, the rotational speed of the polygon mirror 62 is controlled by a mirror control circuit 63. In synchronization with the control of the polygon mirror 62's rotational speed by the mirror control circuit 63, the laser-beam scan portion 61 controls the laser-beam output or the like of each light source (i.e., the R-light source 11a, the G-light source 11b and the B-light source 11c). Besides, the laser-beam scan portion 61 and the mirror control circuit 63 are controlled by a liquid-crystal display circuit (not shown).

For example, using a field sequential method under the control of the liquid-crystal display circuit, the laser-beam scan portion 61 can switch the R-beam, the G-beam and the B-beam which are emitted from the R-light source 11a, the G-light source 11b and the B-light source 11c one after another at a switching interval set within a one-field period in the image display of the liquid-crystal display panel 31, and can drive the liquid-crystal display panel 31 in synchronization with this switching time. In this case, there is no need to provide a color filter for the liquid-crystal display panel 31. This makes it possible to further enhance the light usage efficiency as well as display a high-definition image.

The laser beam 17 is bent perpendicularly to the longitudinal directions of an optical-path change portion 65 (i.e., the turning-back member) by the cylindrical Fresnel lens 64. Thereby, the laser beam 17 is incident perpendicularly to the optical-path change portion 65's longitudinal directions over the whole sweeping width of the polygon mirror 62. By the optical-path change portion 65, the optical path of the incident laser beam 17 is further bent by 180 degrees. In this case, using dichroic mirrors 65a, 65b and 65c (i.e., the color separation member), the laser beam 17 formed by combining the R-beam, the G-beam and the B-beam becomes the monochromatic laser beams 18a, 18b and 18c (refer to FIG. 16 and FIG. 17) which are incident at a mutually different angle upon the end-surface portion 66c. Hence, these are each incident at a different inclination angle to a main-surface portion 66b on the other side which inclines with respect to a main-surface portion 66a on the one side.

Specifically, the dichroic mirrors 65a, 65b and 65c are disposed over the length of the optical-path change portion 65, and further, each has a different angle, as shown in FIG. 15 and FIG. 16. According to this configuration, when the laser beam 17 formed by combining the R-beam, the G-beam and the B-beam are incident on the optical-path change portion 65, using the dichroic mirror 65a which transmits the R-beam and the G-beam and reflects only the B-beam, the B-beam is reflected and incident at a specific angle through the end-surface portion 66c of the light guide plate 66. Next, using the dichroic mirror 65b which transmits the R-beam and reflects only the G-beam, the G-beam is reflected and incident at another specific angle through the end-surface portion 66c of the light guide plate 66. Further, using the dichroic mirror 65c which reflects only the R-beam, the R-beam is reflected and incident at still another specific angle through the end-surface portion 66c of the light guide plate 66.

Then, the monochromatic laser beams 18a, 18b and 18c different in the incidence angle are diffracted by a diffraction grating 67 provided in the other main-surface portion 66b. With kept polarized, they are emitted as a substantially parallel beam from the one main-surface portion 66a and illuminate the liquid-crystal display panel 31. Incidentally, the combination, material or the like of the liquid-crystal display panel 31 and the backlight unit 60 may be the same as the liquid crystal display 30 according to the first embodiment. Hence, their description is omitted.

Next, using FIG. 16 and FIG. 17, a description will be given about the optical path of each monochromatic laser beam 18a, 18b and 18c incident at a mutually different angle through the optical-path change portion 65 which are diffracted by a diffraction grating 67 and emitted in the same direction. FIG. 16 is a sectional view of the optical-path change portion 65 and the light guide plate 66, illustrating the optical paths on which they are incident through the former upon the latter. FIG. 17 is a sectional view of the light guide plate 66, illustrating the incidence angles for diffracting the monochromatic laser beams 18a, 18b and 18c different in the incidence angle using the diffraction grating 67 and emitting them in the same direction.

As shown in FIG. 17, the angle at which the one main-surface portion 66a and the other main-surface portion 66b intersect is θ5, the diffraction angle of the laser beam 17 with respect to a normal 68 perpendicular to the other main-surface portion 66b is θ4, and the incidence angles of the monochromatic laser beams 18a, 18b and 18c with respect to the normal 68 are θ1, θ2 and θ3, respectively. In the case of such angles, if the incidence angles θ1, θ2 and θ3 of the monochromatic laser beams 18a, 18b and 18c are appropriately set, the diffraction angles θ4 of these laser beams become equal to each other. Thus, the monochromatic laser beams 18a, 18b and 18c are combined again, turned into the laser beam 17 and emitted as a substantially parallel beam from the one main-surface portion 66a.

For example, if the diffraction grating 67's pitch is 0.79 μm and if θ4 and θ5 are both ten degrees, then in order to emit all the monochromatic laser beams 18a, 18b and 18c at the same diffraction angle θ4, when the wavelengths of the R-beam, the G-beam and the B-beam are 640 nm, 530 nm and 450 nm, respectively, θ1=80 degrees, θ2=58 degrees and θ3=48 degrees.

In order to allow the monochromatic laser beams 18a, 18b and 18c to be incident at these angles upon the other main-surface portion 66b, as shown in FIG. 16, the inclination of each dichroic mirror 65a, 65b and 65c provided in the optical-path change portion 65 is properly set. Thereby, as shown in FIG. 16, the laser beam 17 incident on the optical-path change portion 65 undergoes a color separation by the dichroic mirrors 65a, 65b and 65c. At the same time, it is incident, as the monochromatic laser beams 18a, 18b and 18c having the incidence angle which corresponds to each wavelength, upon the diffraction grating 67 formed in the other main-surface portion 66b.

In the case of the surface illumination apparatus 60 according to this embodiment, as can be understood from the above description, the laser beam 17 turns into the monochromatic laser beams 18a, 18b and 18c in the midst of its optical path. When finally emitted from the one main-surface portion 66a, however, the laser beam 17 is emitted after they have been combined.

In this way, in the case of the liquid crystal display 70 provided with the surface illumination apparatus 60 according to this embodiment, a relatively large-area surface illumination apparatus can be easily created. This helps realize the liquid crystal display 70 which has a larger screen. Incidentally, in this embodiment, the diffraction grating 67 is provided only in the other main-surface portion 66b of the light guide plate 66. However, a sheet formed with a diffraction grating may be only put in the position of the other main-surface portion 66b of the light guide plate 66 according to this embodiment. In this case, the one main-surface portion 66a is considered as a virtual surface parallel to the liquid-crystal display panel.

Fourth Embodiment

Figure 18:
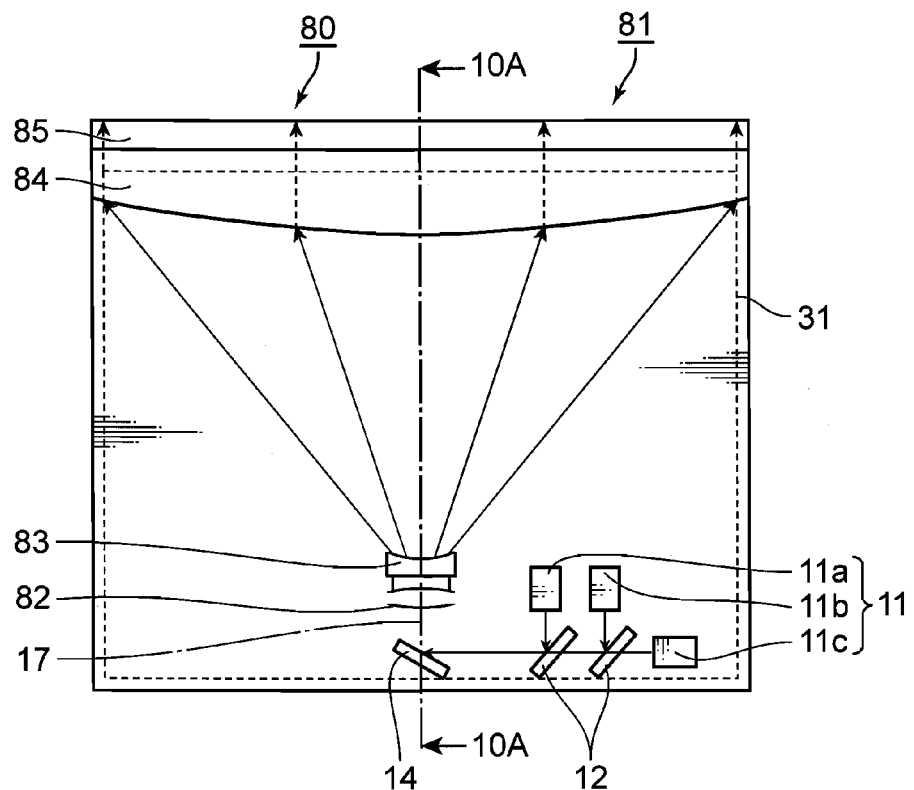
FIG. 18 is a plan view of a liquid crystal display provided with a surface illumination apparatus according to a fourth embodiment of the present invention, seen from the side of the surface illumination apparatus.
Figure 19:
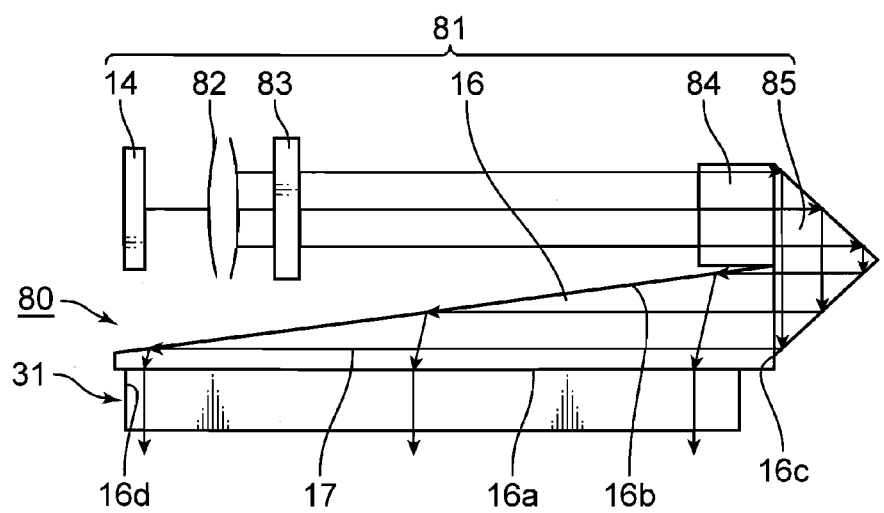
FIG. 19 is a sectional view of the liquid crystal display, cut off along a 10A-10A line shown in FIG. 18.

FIG. 18 is a plan view of a liquid crystal display 80 provided with a surface illumination apparatus 81 according to a fourth embodiment of the present invention, seen from the side of the surface illumination apparatus 81. FIG. 19 is a sectional view of the liquid crystal display 80, cut off along a 10A-10A line shown in FIG. 18. In this embodiment, the surface illumination apparatus 81 is used as a backlight unit, and hereinafter, this surface illumination apparatus 81 will be described as a backlight unit 81.

The liquid crystal display 80 according to this embodiment is characterized in an optical system which allows a substantially parallel beam to be incident on the end-surface portion 16c of the light guide plate 16. The light guide plate 16 is the same as the one used in the surface illumination apparatus 10 according to the first embodiment. Specifically, in the backlight unit 81 according to this embodiment, the combined laser beam 17 is reflected by the reflection mirror 14. Thereafter, as shown in FIG. 19, it is expanded in the longitudinal directions (i.e., the vertical directions to the paper surface of FIG. 18) by a beam expander 82. Further, as shown in FIG. 18, it is expanded in the width directions (i.e., the parallel directions to the paper surface of FIG. 18) by a first cylindrical lens 83. After this, it is incident on a second cylindrical lens 84. The first and second cylindrical lenses 83 and 84 correspond to the enlargement member.

Using the second cylindrical lens 84, the laser beam 17 is bent perpendicularly to the longitudinal directions of an optical-path change portion 85. Thereafter, it is incident on the optical-path change portion 85. Using the optical-path change portion 85, the optical path of the incident laser beam 17 is further bent by 180 degrees. Then, it is incident on the end-surface portion 16c of the light guide plate 16. After this, the process is the same as the first embodiment, and thus, that is omitted.

In the case of the surface illumination apparatus 81 according to this embodiment, there is no need for the end-surface light-guide plate 15 according to the first embodiment. Besides, the laser light source 11, the dichroic mirror 12, the reflection mirror 14, the beam expander 82, the first cylindrical lens 83 and the second cylindrical lens 84 can be disposed on the light guide plate 16. This helps make the surface illumination apparatus 81 smaller. As a result, even if its screen size becomes larger, the liquid crystal display 80 can be smaller as a whole.

Fifth Embodiment

Figure 20:
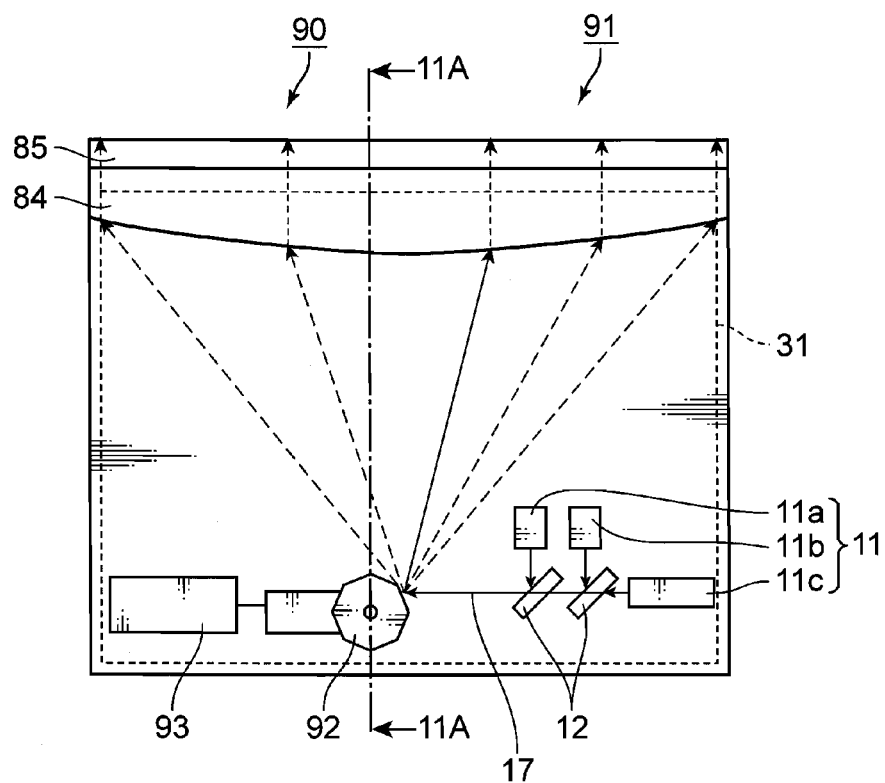
FIG. 20 is a plan view of a liquid crystal display provided with a surface illumination apparatus according to a fifth embodiment of the present invention, seen from the side of the surface illumination apparatus.
Figure 21:
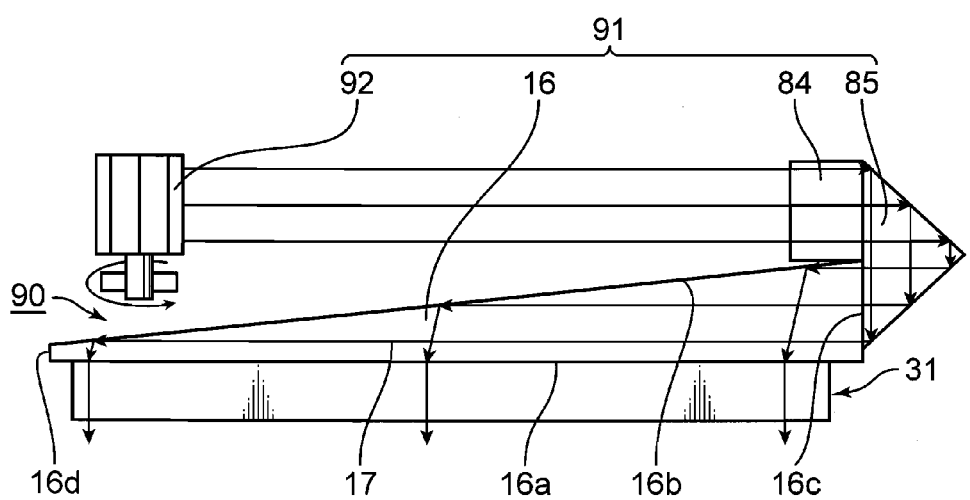
FIG. 21 is a sectional view of the liquid crystal display, cut off along an 11A-11A line shown in FIG. 20.

FIG. 20 is a plan view of a liquid crystal display 90 provided with a surface illumination apparatus 91 according to a fifth embodiment of the present invention, seen from the side of the surface illumination apparatus 91. FIG. 21 is a sectional view of the liquid crystal display 90, cut off along an 11A-11A line shown in FIG. 20. In this embodiment, the surface illumination apparatus 91 is used as a backlight unit, and hereinafter, this surface illumination apparatus 91 will be described as a backlight unit 91.

The liquid crystal display 90 according to this embodiment is characterized in that a polygon mirror 92 is used as an optical system which allows a substantially parallel beam to be incident on the end-surface portion 16c of the light guide plate 16. The light guide plate 16 is the same as the one used in the surface illumination apparatus 10 according to the first embodiment. Specifically, in the backlight unit 91 according to this embodiment, the combined laser beam 17 is reflected by the polygon mirror 92 which is controlled by a mirror control circuit 93. Thereafter, it is incident on the second cylindrical lens 84 while being scanned in the longitudinal directions of the second cylindrical lens 84.

Herein, in the same was as the third embodiment, using a laser-beam scan portion (not shown), as shown in FIG. 21, the laser beam 17 to be incident on the polygon mirror 92 is incident so as to sweep along the polygon mirror 92's mirror surface, so that it can be incident upon the second cylindrical lens 84, over its whole part in the width directions. Then, the laser beam 17 is bent perpendicularly to the longitudinal directions of the optical-path change portion 85 by the second cylindrical lens 84. Thereafter, it is incident on the optical-path change portion 85. Using the optical-path change portion 85, the optical path of the incident laser beam 17 is further bent by 180 degrees. Then, it is incident on the end-surface portion 16c of the light guide plate 16. After this, the process is the same as the first embodiment, and thus, that is omitted.

In the case of the surface illumination apparatus 91 according to this embodiment, there is no need for the end-surface light-guide plate 15 according to the first embodiment. Besides, the laser light source 11, the laser-beam scan portion, the dichroic mirror 12, the polygon mirror 92, the mirror control circuit 93 and the second cylindrical lens 84 can be disposed on the light guide plate 16. This helps make the surface illumination apparatus 91 smaller. As a result, even if its screen size becomes larger, the liquid crystal display 90 can be smaller as a whole.

Sixth Embodiment

Figure 22:
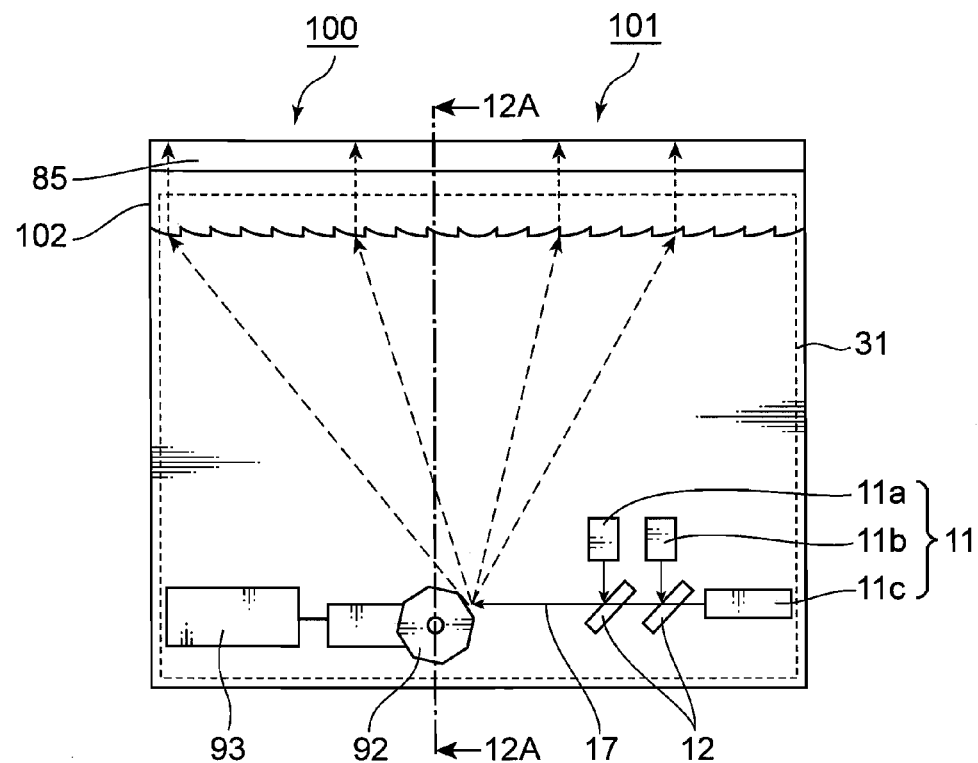
FIG. 22 is a plan view of a liquid crystal display provided with a surface illumination apparatus according to a sixth embodiment of the present invention, seen from the side of the surface illumination apparatus.
Figure 23:
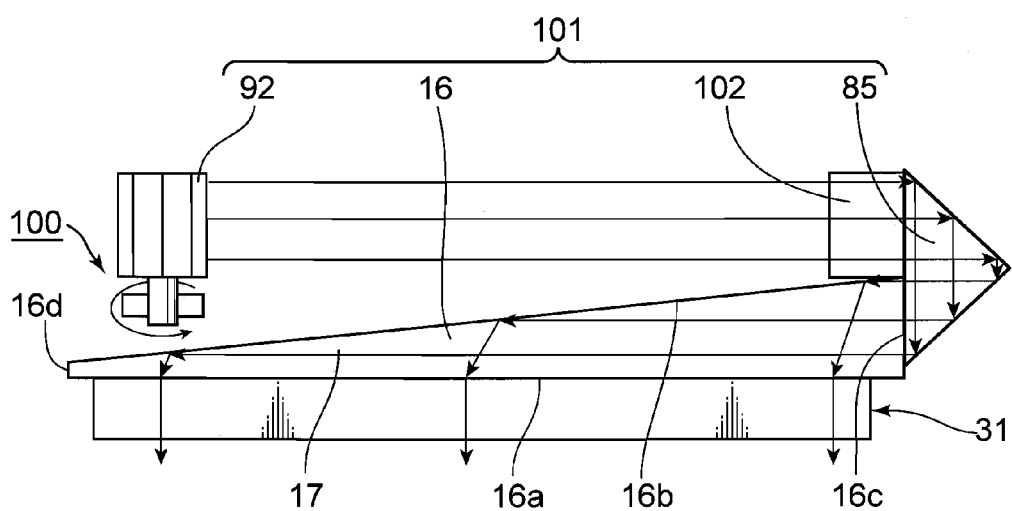
FIG. 23 is a sectional view of the liquid crystal display, cut off along a 12A-12A line shown in FIG. 22.

FIG. 22 is a plan view of a liquid crystal display 100 provided with a surface illumination apparatus 101 according to a sixth embodiment of the present invention, seen from the side of the surface illumination apparatus 101. FIG. 23 is a sectional view of the liquid crystal display 100, cut off along a 12A-12A line shown in FIG. 22. In this embodiment, the surface illumination apparatus 101 is used as a backlight unit, and hereinafter, this surface illumination apparatus 101 will be described as a backlight unit 101.

The liquid crystal display 100 according to this embodiment is characterized in that the second cylindrical lens 84 according to the above described fifth embodiment is replaced with a cylindrical Fresnel lens 102 which has such a shape as shown in FIG. 22. The cylindrical Fresnel lens 102 has the same shape as the cylindrical Fresnel lens 64 according to the third embodiment. The laser beam 17 is bent perpendicularly to the longitudinal directions of an optical-path change portion 85 by the cylindrical Fresnel lens 102. The other configurations are the same as the surface illumination apparatus 91 and the liquid crystal display 90 according to the fifth embodiment. Thus, their description is omitted.

In the case of the surface illumination apparatus 101 according to this embodiment, similarly to the fifth embodiment, there is no need for the end-surface light-guide plate 15. Besides, the laser light source 11, the dichroic mirror 12, the reflection mirror 14, the polygon mirror 92, the mirror control circuit 93 and the cylindrical Fresnel lens 102 can be disposed on the light guide plate 16. This helps make the surface illumination apparatus 101 smaller. As a result, a large-area surface illumination apparatus can be easily created, thus realizing the liquid crystal display 100 which has a larger screen.

Furthermore, in the above described fourth embodiment to sixth embodiment, an example is given in which the light guide plate 16 according to the first embodiment is used as the light guide plate of the surface illumination apparatus. However, for example, the configuration of the light guide plate 42 and the prism sheet 45 according to the second embodiment may also be used. In the same way, the component elements according to the first embodiment to the sixth embodiment can also be optionally combined.

Moreover, in the first embodiment to the sixth embodiment, the R-beam, the G-beam and the B-beam which are emitted from the R-light source, the G-light source and the B-light source are combined, and then, they are incident on the light guide plate. However, the present invention is not limited to this. A beam of light which has a different wavelength from these beams may be further added.

In addition, in the first embodiment to the sixth embodiment: the R-light source, the G-light source and the B-light source which emit at least the R-beam, the G-beam and the B-beam as the laser light source may be used; the light of these colors may be switched one after another at a switching interval set within a one-field period in the image display of the liquid-crystal display panel; and the liquid-crystal display panel may be driven in synchronization with this switching time. Thereby, there is no need to provide a color filter for the liquid-crystal display panel. This makes it possible to further enhance the light usage efficiency as well as display a high-definition image.

Furthermore, in the first embodiment to the sixth embodiment, as the liquid-crystal display panel, the case is described where no polarizing plate is provided on the side of the backlight unit. However, in the same way as any conventional one, the surface illumination apparatus according to each of the first embodiment to the sixth embodiment may also be used as the backlight unit for the liquid-crystal display panel provided with a polarizing plate on the side of the backlight unit as well.

Moreover, in the first embodiment to the sixth embodiment, the liquid-crystal display panel configured so as to be driven by a TFT is described. However, the present invention is not limited to this, for example, it may also be a liquid-crystal display panel which has a simple-matrix drive system. Besides, the present invention can be applied to any display system provided with a liquid crystal, such as a TN system, an STN system and a drive system provided with a ferroelectric liquid crystal, and further, an IPS system, as long as both surfaces are provided with a polarizing plate.

On the basis of each such embodiment as described so far, the present invention is summarized like the following. Specifically, a surface illumination apparatus according to the present invention, comprising: a laser light source which emits a substantially parallel laser beam; and a light guide plate which includes first and second main-surface portions and a first end-surface portion located in an end part of the first and second main-surface portions, wherein a laser beam emitted from the laser light source: is incident at an inclination angle to the first main-surface portion upon the first end-surface portion; is incident on the second main-surface portion after the direction of an optical path thereof is changed by the first main-surface portion; and is emitted as a substantially parallel beam with kept polarized from the second main-surface portion. It is preferable that: as the above laser light source, laser light sources which emit a red light and a blue light include a semiconductor laser and a collimating lens which collimates a laser beam emitted from the semiconductor laser. Further, it is preferable that: a laser light source which emits a green light include a semiconductor laser or a solid state laser which emits an infrared light having a wavelength near 1.06 μm and a second harmonic generator which wavelength-converts the infrared light into a green light.

According to this configuration, using a uniformly-polarized laser beam, for example, a liquid-crystal display panel can be irradiated with its polarization preserved. Therefore, the usage efficiency of a beam of light incident upon the liquid-crystal display panel can be improved. Thus, if this surface illumination apparatus is used as the backlight unit, a high intensity and a low-level power consumption can be realized. Besides, as the laser beam, a red beam, a blue beam and a green beam with a good color purity is obtained, so that the range of color reproduction can be enlarged to enhance the picture quality. Incidentally, the substantially parallel beam means, for example, that the emission direction of a laser beam emitted from the second main-surface portion is within ±5 degrees. Further, it means, more desirably, that the laser beam should be emitted perpendicularly to the second main-surface portion and within ±5 degrees.

It is preferable that: the first main-surface portion incline in the direction where the light guide plate becomes thinner from the first end-surface portion toward a second end-surface portion opposite to the first end-surface portion; the first main-surface portion be formed with a plural of first curved-surface portions from the first end-surface portion toward the second end-surface portion, and the first curved-surface portion reflect the laser beam incident on the first end-surface portion toward of the second main-surface portion; the second main-surface portion be formed with a plural of second curved-surface portions in the position corresponding to the plural of first curved-surface portions from the first end-surface portion toward the second end-surface portion, and the second curved-surface portion have a curvature for emitting the laser beam reflected by the first curved-surface portion as a substantially parallel beam from the second main-surface portion; and the laser beam incident on the first end-surface portion be emitted as a substantially parallel beam from the second main-surface portion after the direction of the optical path thereof is changed by the first and second curved-surface portions.

In this case, the laser beam can be reflected by the first curved-surface portion formed in the first main-surface portion of the light guide plate and can be emitted as a substantially parallel beam from the second curved-surface portion formed in the second main-surface portion. Therefore, compared with a mere inclination configuration, the light guide plate's area can be enlarged without thickening the light guide plate. Further, the second curved-surface portion of the second main-surface portion has a shape which corresponds to that of the first curved-surface portion of the first main-surface portion. Therefore, the laser beam can be emitted substantially perpendicularly to the second main-surface portion. Moreover, if this surface illumination apparatus is used as the backlight unit of a liquid crystal display, the light usage efficiency can be enhanced. In this case, the laser beam may be incident substantially in parallel with the second main-surface portion, in other words, substantially perpendicularly to the first end-surface portion. Or, if it is designed to be incident with an inclination with respect to the first main-surface portion, it may also be incident at an angle to the second main-surface portion.

Preferably: the first curved-surface portion should include a continuous curved surface which reflects the incident laser beam so that this laser beam is incident on the whole surface of the second curved-surface portion; the second curved-surface portion should be shaped like a lens whose focal point coincides with the intersection point of the optical axes of the laser beams reflected by the first curved-surface portion; and the laser beam reflected by the first curved-surface portion should be emitted as a substantially parallel beam in a substantially perpendicular direction to the second main-surface portion after the direction of the optical path thereof is changed by the second curved-surface portion.

In this case, the laser beam incident through the first end-surface portion can be emitted, with a uniform intensity distribution, substantially perpendicularly to the second curved-surface portion from the whole surface of the second curved-surface portion. Therefore, a substantially parallel beam having a uniform intensity can be emitted from the entire second main-surface portion of the light guide plate.

The thickness between the first main-surface portion and the second main-surface portion may be substantially constant; the first main-surface portion may be formed with a first diffraction grating which has a lattice vector in the direction where the laser beam incident on the first end-surface portion advances; the second main-surface portion may be formed with a second diffraction grating which further diffracts the beam diffracted by the first diffraction grating and emits this beam as a substantially parallel beam; and the laser beam incident on the first end-surface portion may be emitted as a substantially parallel beam from the second main-surface portion after diffracted by the first diffraction grating and the second diffraction grating.

In this case, the laser beam is incident upon the first end-surface portion, diffracted by the first diffraction grating formed in the first main-surface portion of the light guide plate and diffracted again by the second diffraction grating formed in the second main-surface portion. Therefore, the laser beam can be emitted as a substantially parallel beam from the second main-surface portion. In this case, the laser beam needs to be incident through the first end-surface portion upon the first main-surface portion so that it inclines with respect to the first main-surface portion.

It is preferable that: the laser light source emit a laser beam formed by combining a red light, a green light and a blue light; the first diffraction grating separate the combined laser beam into each color and reflect the red light in a first direction, the green light in a second direction different from the first direction and the blue light in a third direction different from the first and second directions; and the second diffraction grating have a pitch substantially equal to the first diffraction grating, diffract the red light incident in the first direction, the green light incident in the second direction and the blue light incident in the third direction, and emit each beam as a substantially parallel beam.

In this case, the laser beam including the red light, the green light and the blue light is incident upon the first end-surface portion. Then, it is diffracted by the first diffraction grating formed in the first main-surface portion of the light guide plate and is incident upon the second main-surface portion after separated into the red light, the green light and the blue light. After this color separation, the red light, the green light and the blue light are diffracted again by the second diffraction grating formed in the second main-surface portion. Therefore, they can be emitted as a substantially parallel beam from the second main-surface portion.

Preferably, an optical-path change member be further provided which changes the optical path of the laser beam emitted from the second main-surface portion in a substantially perpendicular direction to the second main-surface portion.

In this case, the laser beam emitted from the second main-surface portion is emitted in a substantially perpendicular direction to the second main-surface portion. Therefore, if this surface illumination apparatus is used as the backlight unit of a liquid crystal display, an image having an excellent view angle characteristic can be displayed.

The first main-surface portion may incline in the direction where the light guide plate becomes thinner from the first end-surface portion toward a second end-surface portion opposite to the first end-surface portion; the first main-surface portion may be formed with a diffraction grating which has a lattice vector in the direction where the laser beam incident on the first end-surface portion advances; and the laser beam incident on the first end-surface portion may be emitted as a substantially parallel beam from the second main-surface portion after the direction of the optical path thereof is changed by the diffraction grating.

In this case, for example, the laser beam including a red light, a green light and a blue light is incident upon the first end-surface portion and is diffracted by the diffraction grating formed in the first main-surface portion of the light guide plate. Thereby, from the whole surface of the second main-surface portion, the red light, the green light and the blue light can be emitted as a substantially parallel beam. In this case, the laser beam may be incident substantially in parallel with the second main-surface portion, in other words, substantially perpendicularly to the first end-surface portion. Or, if it is designed to be incident with an inclination with respect to the first main-surface portion, it may also be incident at an angle to the second main-surface portion.

It is preferable that: the laser light source emit a laser beam formed by combining a red light, a green light and a blue light; a color separation member be further provided which separates the combined laser beam into each color and emits the red light in a first direction, the green light in a second direction different from the first direction and the blue light in a third direction different from the first and second directions; and the diffraction grating diffract the red light incident in the first direction, the green light incident in the second direction and the blue light incident in the third direction, and emit each beam in a substantially perpendicular direction to the second main-surface portion.

In this case, the green light and the blue light are incident at a mutually-different incidence angle upon the first main-surface portion. Then, the red light, the green light and the blue light are incident in a substantially perpendicular direction to the second main-surface portion. Therefore, the beams with these wavelengths can be emitted substantially perpendicularly to the second main-surface portion and as a substantially parallel beam from the second main-surface portion. As a result, if this surface illumination apparatus is used as the backlight unit of a liquid crystal display, the light usage efficiency can be enhanced.

Preferably, a first laser-beam scan portion should be further provided which scans the laser beam incident on the first end-surface portion in the thickness directions of the light guide plate.

In this case, the red light, even if the light guide plate is relatively thick, the laser beam can be incident uniformly over the whole thickness. Therefore, a substantially parallel beam with a uniform intensity can be emitted from the entire second main-surface portion of the light guide plate.

It is preferable that further provided be: a second laser-beam scan portion which scans the laser beam scanned by the first laser-beam scan portion in the longitudinal directions of the first end-surface portion; an optical conversion member which converts the laser beam scanned by the second laser-beam scan portion into a substantially parallel beam; and a turning-back member which turns back the substantially parallel beam formed after the conversion by the optical conversion member and guides this substantially parallel beam to the first end-surface portion, wherein the laser light source, the first and second laser-beam scan portions, the optical conversion member and the turning-back member be disposed on the first main-surface portion.

In this case, the laser light source, the first and second laser-beam scan portions, the optical conversion member and the turning-back member are disposed on the first main-surface portion. This helps make the surface illumination apparatus smaller. As a result, in the case where this surface illumination apparatus is used as the backlight unit of a liquid crystal display, even if its screen size is enlarged, the liquid crystal display becomes small as its full size.

Further provided may be: an enlargement member which enlarges a laser beam emitted from the laser light source in the thickness directions of the light guide plate and in the longitudinal directions of the first end-surface portion; an optical conversion member which converts the laser beam enlarged by the enlargement member into a substantially parallel beam; and a turning-back member which turns back the substantially parallel beam formed after the conversion by the optical conversion member and guides this substantially parallel beam to the first end-surface portion, wherein the laser light source, the enlargement member, the optical conversion member and the turning-back member may be disposed on the first main-surface portion.

In this case, the laser light source, the enlargement member, the optical conversion member and the turning-back member are disposed on the first main-surface portion. This helps make the surface illumination apparatus smaller. As a result, in the case where this surface illumination apparatus is used as the backlight unit of a liquid crystal display, even if its screen size is enlarged, the liquid crystal display becomes small as its full size.

Preferably: the laser light source should include a plurality of light sources having at least light sources which emit beams with the wavelength of a red light, a green light and a blue light, and a laser combining portion which combines the beams emitted from the plurality of light sources; and a beam with a plurality of wavelengths combined by the laser combining portion should be incident on the first end-surface portion.

In this case, the optical system of a laser beam incident on the first end-surface portion can be simplified. At the same time, a laser beam formed by mixing a plurality of wavelengths or a laser beam with each wavelength can be individually emitted with ease from one main surface.

A liquid crystal display according to the present invention, comprising: a liquid-crystal display panel; and a backlight unit which illuminates the liquid-crystal display panel, wherein: the backlight unit is formed by the above described surface illumination apparatus; and the surface illumination apparatus and the liquid-crystal display panel are arranged so that the polarization-axis angle of a laser beam emitted from the surface illumination apparatus becomes a predetermined angle with respect to the polarization-axis angle of a polarizing plate disposed on the view side of the liquid-crystal display panel.

According to this configuration, a laser beam emitted from the surface illumination apparatus as the backlight unit can be efficiently used, thus realizing a high intensity and a low-level power consumption.

Preferably, the liquid-crystal display panel should not provided with a polarizing plate between the surface illumination apparatus and the liquid-crystal display panel, and a laser beam emitted from the surface illumination apparatus should be incident without passing through the polarizing plate upon the liquid-crystal display panel.

In this case, without passing through any polarizing plate, a laser beam is incident upon the liquid-crystal display panel. This makes it possible to not only heighten the light usage efficiency, but also decrease the number of components and lower the cost of the liquid crystal display.

It is preferable that: a laser beam emitted from the surface illumination apparatus include at least a red light, a green light and a blue light; the lights of these colors be switched one after another at a switching interval set within a one-field period in the image display of the liquid-crystal display panel; and the liquid-crystal display panel be driven in synchronization with the switching time.

In this case, there is no need to provide a color filter for the liquid-crystal display panel. This makes it possible to further enhance the light usage efficiency as well as display a high-definition image.

According to the surface illumination apparatus according to the present invention, a laser beam can be incident on a liquid-crystal display panel with this laser beam's polarization preserved. Hence, there is no need to provide any polarizing plate on the side of a backlight unit, so that the laser beam can be more efficiently used. Therefore, a liquid crystal display provided with this surface illumination apparatus as its backlight unit is capable of realizing a high intensity and a low-level power consumption. Accordingly, it is useful for a television set, as well as various electronic-equipment fields which need a display.

This application is based on Japanese patent application serial No. 2007-033172, filed in Japan Patent Office on Feb. 14, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A surface illumination apparatus comprising:
   a laser light source which emits a substantially parallel laser beam; and
   a light guide plate comprising: a first main-surface portion; a second main-surface portion opposite said first main-surface portion; a first end-surface portion; and a second end-surface portion located opposite said first end-surface portion,
   wherein:
      a laser beam emitted from the laser light source is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and the beam is kept polarized and emitted as a substantially parallel beam from the second main-surface portion out of the light guide plate;
      the first main-surface portion inclines such that the light guide plate becomes thinner from the first end-surface portion toward the second end-surface portion opposite to the first end-surface portion;
      the first main-surface portion is formed with a plurality of first curved-surface portions from the first end-surface portion toward the second end-surface portion, and the first curved-surface portions reflect the laser beam incident on the first end-surface portions toward of the second main-surface portion;
      the second main-surface portion is formed with a plurality of second curved-surface portions in positions respectively corresponding to the plurality of first curved-surface portions from the first end-surface portion toward the second end-surface portion, and the second curved-surface portions have a curvature for emitting the laser beam reflected by the first curved-surface portions as a substantially parallel beam from the second main-surface portion; and
      the laser beam incident on the first end-surface portion of the light guide plate is emitted as a substantially parallel beam from the second main-surface portion of the light guide plate after the direction of the optical path thereof is changed by the first and second curved-surface portions.

2. The surface illumination apparatus according to claim 1, wherein:
   each first curved-surface portion includes a continuous curved surface which reflects the incident laser beam so that this laser beam is incident on the whole surface of the second curved-surface portion;
   the second curved-surface portion is shaped like a lens whose focal point coincides with the intersection point of the optical axes of the laser beams reflected by the first curved-surface portion; and
   the laser beam reflected by the first curved-surface portion is emitted as a substantially parallel beam in a substantially perpendicular direction to the second main-surface portion after the direction of the optical path thereof is changed by the second curved-surface portion.

3. A surface illumination apparatus comprising:
   a laser light source which emits a substantially parallel laser beam; and
   a light guide plate comprising: a first main-surface portion; a second main-surface portion opposite said first main-surface portion; a first end-surface portion; and a second end-surface portion located opposite said first end-surface portion,
   wherein:
      a laser beam emitted from the laser light source: is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and is kept polarized and emitted as a substantially parallel beam from the second main-surface portion out of the light guide plate;
      the thickness between the first main-surface portion and the second main-surface portion is substantially constant;
      the first main-surface portion is formed with a first diffraction grating which has a lattice vector in the direction where the laser beam incident on the first end-surface portion advances;
      the second main-surface portion is formed with a second diffraction grating which further diffracts the beam diffracted by the first diffraction grating and emits this beam as a substantially parallel beam; and
      the laser beam incident on the first end-surface portion is emitted as a substantially parallel beam from the second main-surface portion after being diffracted by the first diffraction grating and the second diffraction grating.

4. The surface illumination apparatus according to claim 3, wherein:
the laser light source emits a laser beam formed by combining a red light, a green light and a blue light;
the first diffraction grating separates the combined laser beam into each color and reflects the red light in a first direction, the green light in a second direction different from the first direction and the blue light in a third direction different from the first and second directions; and
the second diffraction grating: has a pitch substantially equal to the first diffraction grating;
diffracts the red light incident in the first direction, the green light incident in the second direction and the blue light incident in the third direction; and emits each beam as a substantially parallel beam.

5. The surface illumination apparatus according to claim 3, further comprising an optical-path change member which changes the optical path of the laser beam emitted from the second main-surface portion in a substantially perpendicular direction to the second main-surface portion.

6. A surface illumination apparatus comprising:
a laser light source which emits a substantially parallel laser beam; and
a light guide plate comprising: a first main-surface portion; a second main-surface portion opposite said first main-surface portion; a first end-surface portion; and a second end-surface portion located opposite said first end-surface portion,
wherein:
a laser beam emitted from the laser light source: is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and the beam is kept polarized and emitted as a substantially parallel beam from the second main-surface portion out of the light guide plate;
the first main-surface portion inclines such that the light guide plate becomes thinner from the first end-surface portion toward the second end-surface portion opposite to the first end-surface portion;
the first main-surface portion is formed with a diffraction grating which has a lattice vector in the direction where the laser beam incident on the first end-surface portion advances; and
the laser beam incident on the first end-surface portion is emitted as a substantially parallel beam from the second main-surface portion after the direction of the optical path thereof is changed by the diffraction grating.

7. The surface illumination apparatus according to claim 6, wherein:
the laser light source emits a laser beam formed by combining a red light, a green light and a blue light;
a color separation member is further provided which separates the combined laser beam into each color and emits the red light in a first direction, the green light in a second direction different from the first direction and the blue light in a third direction different from the first and second directions; and the diffraction grating diffracts the red light incident in the first direction, the green light incident in the second direction and the blue light incident in the third direction, and emits each beam in a substantially perpendicular direction to the second main-surface portion.

8. A surface illumination apparatus comprising:
a laser light source which emits a substantially parallel laser beam;
a light guide plate comprising: a first main-surface portion; a second main-surface portion opposite said first main-surface portion; a first end-surface portion; and a second end-surface portion located opposite said first end-surface portion,
wherein: a laser beam emitted from the laser light source: is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and the beam is kept polarized and emitted as a substantially parallel beam from the second main-surface portion out of the light guide plate;
a first laser-beam scan portion which scans the laser beam on the first end-surface portion, in a first direction which connects the first main-surface portion and the second main-surface portion;
a second laser-beam scan portion which scans the laser beam scanned by the first laser-beam scan portion in a second direction substantially perpendicular to the first direction;
an optical conversion member which converts the laser beam scanned by the second laser-beam scan portion into a substantially parallel beam; and
a turning-back member which turns back the substantially parallel beam formed after the conversion by the optical conversion member and guides this substantially parallel beam to the first end-surface portion,
wherein the laser light source, the first and second laser-beam scan portions, the optical conversion member and the turning-back member are disposed on the first main-surface portion.

9. A surface illumination apparatus comprising:
a laser light source which emits a substantially parallel laser beam; and
a light guide plate comprising: a first main-surface portion; a second main-surface portion opposite said first main-surface portion; a first end-surface portion; and a second end-surface portion located opposite said first end-surface portion,
wherein: a laser beam emitted from the laser light source: is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and the beam is kept polarized and emitted as a substantially parallel beam from the second main-surface portion out of the light guide plate;
an enlargement member which enlarges a laser beam emitted from the laser light source in a first direction which connects the first main-surface portion and the second main-surface portion of the light guide plate and in a second direction substantially perpendicular to the first direction;

an optical conversion member which converts the laser beam enlarged by the enlargement member into a substantially parallel beam; and a turning-back member which turns back the substantially parallel beam formed after the conversion by the optical conversion member and guides this substantially parallel beam to the first end-surface portion, wherein the laser light source, the enlargement member, the optical conversion member and the turning-back member are disposed on the first main-surface portion.

10. The surface illumination apparatus according to claim 1, wherein:

the laser light source includes a plurality of light sources having at least light sources which emit beams with the wavelengths of a red light, a green light and a blue light, and a laser combining portion which combines the beams emitted from the plurality of light sources; and a beam with a plurality of wavelengths combined by the laser combining portion is incident on the first end-surface portion.

11. A liquid crystal display, comprising:

a liquid-crystal display panel; and a backlight unit which illuminates the liquid-crystal display panel, wherein:

the backlight unit is formed by a surface illumination apparatus; and the surface illumination apparatus and the liquid-crystal display panel are arranged so that the polarization-axis angle of a laser beam emitted from the surface illumination apparatus becomes a predetermined angle with respect to the polarization-axis angle of a polarizing plate disposed on the view side of the liquid-crystal display panel;

said surface illumination apparatus comprising:

a laser light source which emits a substantially parallel laser beam; and a light guide plate comprising: a first main-surface portion; a second main-surface portion opposite said first main-surface portion; a first end-surface portion; and a second end-surface portion located opposite said first end-surface portion, wherein: a laser beam emitted from the laser light source: is incident at an inclination angle to the first main-surface portion such that it enters into said light guide plate and the beam is thereafter incident on the second main-surface portion, in said light guide plate, after the direction of an optical path thereof is changed by the first main-surface portion and the beam is reflected within said light guide plate by said first main-surface portion, and the beam is kept polarized and emitted as a substantially parallel beam from the second main-surface portion out of the light guide plate.

12. The liquid crystal display according to claim 11, wherein the liquid-crystal display panel is not provided with a polarizing plate between the surface illumination apparatus and the liquid-crystal display panel, and a laser beam emitted from the surface illumination apparatus is incident without passing through the polarizing plate upon the liquid-crystal display panel.

13. The liquid crystal display according to claim 12, wherein: a laser beam emitted from the surface illumination apparatus includes at least a red light, a green light and a blue light;

the lights of these colors are switched one after another at a switching interval set within a one-field period in the image display of the liquid-crystal display panel; and the liquid-crystal display panel is driven in synchronization with the switching time.

* * * * *